US012812658B2

(12) United States Patent
Li

(10) Patent No.: US 12,812,658 B2
(45) Date of Patent: Nov. 24, 2026

(54) PDCCH MONITORING METHOD, RELATED DEVICE, AND READABLE STORAGE MEDIUM

(71) Applicant: VIVO MOBILE COMMUNICATION CO., LTD., Chang'an (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 373 days.

(21) Appl. No.: 18/434,105

(22) Filed: Feb. 6, 2024

(65) Prior Publication Data

US 2024/0196414 A1 Jun. 13, 2024

Related U.S. Application Data

(63) Continuation of application No. PCT/CN2022/110265, filed on Aug. 4, 2022.

(30) Foreign Application Priority Data

Aug. 6, 2021 (CN) ......................... 202110902840.7

(51) Int. Cl.
*H04W 72/232* (2023.01)
*H04W 72/0446* (2023.01)
*H04W 72/51* (2023.01)

(52) U.S. Cl.
CPC ..... *H04W 72/232* (2023.01); *H04W 72/0446* (2013.01); *H04W 72/51* (2023.01)

(58) Field of Classification Search
CPC ........... H04W 72/232; H04W 72/0446; H04W 72/51; H04W 24/08; H04W 8/24; H04L 5/001; H04L 5/0053; H04L 5/0094
See application file for complete search history.

(56) References Cited

U.S. PATENT DOCUMENTS

2020/0329389 A1* 10/2020 Hosseini ............... H04L 5/0091
2021/0160002 A1* 5/2021 Salah .................... H04L 1/0039
(Continued)

FOREIGN PATENT DOCUMENTS

CN 111263450 A 6/2020
CN 112312562 A 2/2021
(Continued)

OTHER PUBLICATIONS

International Search Report for International Application No. PCT/CN2022/110265 of Sep. 27, 2022.
(Continued)

*Primary Examiner* — Luat Phung
(74) *Attorney, Agent, or Firm* — Perilla Knox & Hildebrandt LLP; Kenneth A. Knox

(57) ABSTRACT

This application discloses a PDCCH monitoring method, a related device, and a readable storage medium. The PDCCH monitoring method includes: receiving, by a terminal, first information, where the terminal supports at least a multislot-based PDCCH monitoring capability, and the first information includes at least one of the following: a search space configuration or a PDCCH monitoring capability configuration; determining, by the terminal based on the first information, a PDCCH monitoring capability corresponding to each of N cells of the terminal, N being an integer greater than 1; and monitoring, by the terminal, PDCCHs of the N cells based on the PDCCH monitoring capability corresponding to each of the N cells.

16 Claims, 5 Drawing Sheets

(56) References Cited

U.S. PATENT DOCUMENTS

| | | | | |
|---|---|---|---|---|
| 2022/0295319 | A1* | 9/2022 | Lin | H04L 5/0053 |
| 2024/0155636 | A1* | 5/2024 | Chatterjee | H04L 27/2602 |
| 2024/0205928 | A1* | 6/2024 | Bhamri | H04L 5/0053 |

FOREIGN PATENT DOCUMENTS

| | | | |
|---|---|---|---|
| CN | 112788625 | A | 5/2021 |
| CN | 112825581 | A | 5/2021 |
| CN | 112889304 | A | 6/2021 |

OTHER PUBLICATIONS

Extended European Search Report for EP Patent Application No. 22852300.7 of Oct. 7, 2024.

3GPP TSG RAN WG1, "Reduced PDCCH monitoring for RED-CAP NR devices," 3GPP TSG RAN WG1 Meeting #103-e, R1-2008115, e-Meeting, Oct. 26-Nov. 13, 2020, NEC. [Discussion Document].

3GPP TSG RAN WG1, "Discussions on PDCCH monitoring enhancements for NR from 52.6-71 GHz," 3GPP TSG RAN WG1 Meeting #104b-e, R1-2102515, e-Meeting, Apr. 12-20, 2021, vivo. [Discussion and Decision Document].

* cited by examiner

PDCCH MONITORING METHOD, RELATED DEVICE, AND READABLE STORAGE MEDIUM

CROSS-REFERENCE TO RELATED APPLICATIONS

This application is a Bypass Continuation Application of PCT International Application No. PCT/CN2022/110265 filed on Aug. 4, 2022, which claims priority to Chinese Patent Application No. 202110902840.7 filed in China on Aug. 6, 2021, which is incorporated herein by reference in its entirety.

TECHNICAL FIELD

This application pertains to the field of communication technologies, and specifically, relates to a PDCCH monitoring method, a related device, and a readable storage medium.

BACKGROUND

For new radio (NR) operating at high frequency, the granularity of symbol and slot decreases due to an increase of a subcarrier spacing (SCS). If a physical downlink control channel (PDCCH) monitoring capability is defined based on granularity of per slot or per span (per span includes a plurality of symbols), it may result in high complexity in implementation of terminals.

SUMMARY

According to a first aspect, a PDCCH monitoring method is provided, where the method includes:

- receiving, by a terminal, first information, where the terminal supports at least a multislot-based PDCCH monitoring capability, and the first information includes at least one of the following: a search space configuration or a PDCCH monitoring capability configuration;
- determining, by the terminal based on the first information, a PDCCH monitoring capability corresponding to each of N cells of the terminal, N being an integer greater than 1; and
- monitoring, by the terminal, PDCCHs of the N cells based on the PDCCH monitoring capability corresponding to each of the N cells.

According to a second aspect, a PDCCH monitoring method is provided, where the method includes:

- sending, by a network-side device, first information, where the first information includes at least one of the following: a search space configuration or a PDCCH monitoring capability configuration.

According to a third aspect, a PDCCH monitoring apparatus is provided, where the PDCCH monitoring apparatus includes:

- a first receiving module, configured to receive first information, where the apparatus supports at least a multislot-based PDCCH monitoring capability, and the first information includes at least one of the following: a search space configuration or a PDCCH monitoring capability configuration;
- a first determining module, configured to determine, based on the first information, a PDCCH monitoring capability corresponding to each of N cells of the terminal, N being an integer greater than 1; and
- a monitoring module, configured to monitor PDCCHs of the N cells based on the PDCCH monitoring capability corresponding to each of the N cells.

According to a fourth aspect, a PDCCH monitoring apparatus is provided, where the PDCCH monitoring apparatus includes:

- a second transmission module, configured to send first information, where the first information includes at least one of the following: a search space configuration or a PDCCH monitoring capability configuration.

According to a fifth aspect, a terminal is provided, where the terminal includes a processor, a memory, and a program or instructions stored in the memory and capable of running on the processor, and when the program or the instructions are executed by the processor, the steps of the method according to the first aspect are implemented.

According to a sixth aspect, a network-side device is provided, where the network-side device includes a processor, a memory, and a program or instructions stored in the memory and capable of running on the processor, and when the program or the instructions are executed by the processor, the steps of the method according to the second aspect are implemented.

According to a seventh aspect, a terminal is provided, including a processor and a communication interface, where

- the communication interface is configured to:
- receive first information, where the terminal supports at least a multislot-based PDCCH monitoring capability, and the first information includes at least one of the following: a search space configuration or a PDCCH monitoring capability configuration; and
- the processor is configured to:
- determine, based on the first information, a PDCCH monitoring capability corresponding to each of N cells of the terminal, N being an integer greater than 1; and
- monitor PDCCHs of the N cells based on the PDCCH monitoring capability corresponding to each of the N cells.

According to an eighth aspect, a network-side device is provided, including a processor and a communication interface, where the communication interface is configured to:

- send first information, where the first information includes at least one of the following: a search space configuration or a PDCCH monitoring capability configuration.

According to a ninth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a tenth aspect, a chip is provided, where the chip includes a processor and a communication interface, the communication interface is coupled to the processor, and the processor is configured to run a program or instructions to implement the method according to the first aspect or implement the method according to the second aspect.

According to an eleventh aspect, a computer program/program product is provided, where the computer program/program product is stored in a non-transitory storage medium, and the program/program product is executed by at least one processor to implement the method according to the first aspect or the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
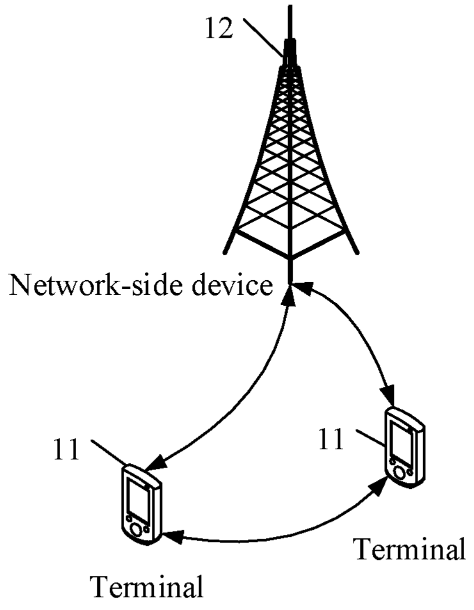
FIG. 1 is a schematic diagram of a wireless communication system according to an embodiment of this application.

FIG. 1 is a schematic diagram of a wireless communication system according to an embodiment of this application. The wireless communication system includes a terminal 11 and a network-side device 12. The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), and a smart home device (a home device with wireless communication function, such as refrigerator, TV, washing machine, or furniture). The wearable device includes: a smart watch, a wrist band, smart earphones, smart glasses, smart jewelry (smart bracelet, smart wristband, smart ring, smart necklace, smart anklet, smart ankle bracelet, or the like), smart wristband, smart clothing, game console, and the like. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

For ease of understanding, the following describes some content included in the embodiments of this application.

I. Physical Downlink Control Channel (PDCCH) Monitoring Capability in New Radio (NR) Rel-15

In NR Rel-15, the PDCCH monitoring capability can be categorized into mandatory and optional capabilities.

Mandatory without capability signaling capabilities are shown below:

(1) Control resource set (CORESET): One additional CORESET can be configured per bandwidth part (BWP) per cell in addition to CORESET 0.

FR1: 6-radio-bearer (RB) bitmap+1 to 3 symbols.

FR2: 6RB bitmap+1 to 3 symbols for type-0, type 0A, or type 2 common search spaces (CSS) and type 1 CSS without dedicated radio resource control (RRC) configuration; and 6RB bitmap+1 to 2 symbols for type 1 CSS with dedicated RRC configuration, type 3 CSS, and user equipment (UE)-specific search space (USS).

Resource element group bundle size (REG-bundle size): 2/3/6.

Interleaved and non-interleaved control channel element to resource element group mapping.

Supporting configuration of precoder granularity size to be REG bundle size.

Supporting dedicated demodulation reference signal (DM-RS) scrambling.

Supporting configuration of one or more transmission configuration indicator states (TCI states).

2) Unicast PDCCH transmission in CSS and USS.

Aggregation levels (AL) 1, 2, 4, 8, and 16.

A maximum of three search space sets (SS sets) per slot per BWP (which is defined based on a scheduled cell) for a scheduled secondary cell (SCell), where the limitation is applied before search space (SS) dropping.

For type 1 CSS with dedicated RRC configuration, type 3 CSS, and USS, the monitoring occasion is within the first three symbols of one slot.

For type 0, 0A, and 2 CSSs and for type 1 CSS without dedicated RRC configuration, the monitoring occasion may be at any one symbol of one slot and within a single span (of three consecutive orthogonal frequency division multiplexing (OFDM) symbols) within one slot.

3) Supporting monitoring of downlink control information (DCI) 0_0, 0_1, 1_0, and 1_1.

4) For a frequency division duplex (FDD) system, only one piece of DCI scheduling downlink (DL) unicast transmission and one piece of DCI scheduling uplink (UL) unicast transmission are processed per slot for each scheduled component carrier (CC).

5) For a time division duplex (FDD) system, only one piece of DCI scheduling DL unicast transmission and two pieces of DCI scheduling UL unicast transmission are processed per slot for each scheduled CC.

Mandatory with capability signaling capabilities are as follows:

CORESET in FR2.

6RB bitmap+3 symbols for type 1 CSS with dedicated RRC configuration, type 3 CSS, and USS.

Optional capabilities are as follows:

1) PDCCH-MonitoringSingleOccasion.

FR1: Indicating the UE to support reception of PDCCH scrambled by cell radio network temporary identifier (C-RNTI) and configured scheduling radio network temporary identifier (CS-RNTI) in any three consecutive symbols within one 15 kilohertz (KHz) slot.

2) PDCCH-MonitoringAnyOccasions.

WithoutDCI-gap: For type 1 CSS with dedicated RRC configuration, type 3 CSS, and USS, monitoring occasions may be at any one symbol of one slot and satisfies a limitation of blind decoding (BD) budget.

WithDCI-gap: For type 1 CSS with dedicated RRC configuration, type 3 CSS, and USS, monitoring occasions can be at any symbol of one slot. However, a specific gap limitation and a BD budget limitation need to be satisfied between any two consecutive PDCCHs that are scrambled with C-RNTI, modulation and coding scheme (MCS)-C-RNTI, or CS-RNTI: 2 symbols for 15 KHz (2 symbols for 15 KHz); 4 symbols for 30 KHz (4 symbols for 30 KHz), 7 symbols for (60 KHz, NCP) (7 symbols for (60 KHz, NCP)), 14 symbols for 120 KHz (14 symbols for 120 KHz).

3) PDCCH-MonitoringAnyOccasionsWithSpanGap.

A span pattern is determined based on UE-reported (X,Y) values configured for all SS monitoring occasions.

The span pattern is the same for each slot.

A start position of the 1st span in a span pattern is a position of the 1st monitoring occasion in any one slot. The length of span is max{maximum value of all CORESET durations (maximum value of all CORESET durations), minimum value of Y in the UE reported candidate value (minimum value of Y in the UE reported candidate value)}. The length of the last span may be shorter; and a start position of the next span is the 1st position not included in the monitoring occasion of the previous span.

It is checked whether the span pattern satisfies a (X,Y) limitation of at least one report.

II. PDCCH Monitoring Capability in NR Rel-16.

In NR Rel-16, all PDCCH monitoring capabilities are optional capabilities as follows:

PDCCH-Monitoring-r16: Different from Rel-15, a supported span value can be reported per physical downlink shared channel (PDSCH) processing type (Per PDSCH processing type) per subcarrier spacing (Per SCS), and a corresponding BD/control channel element (CCE) limitation is applied for each span.

PDCCH-MonitoringMixed-r16: supporting different PDCCH monitoring capability configurations for different serving cells.

PDCCH-MonitoringCA-r16: UE report pdcch-Monitoring-r16, indicating the maximum number of monitoring cells for BD and CCE limitation per span, and also indicating whether supported span arrangement is aligned.

III. Processing of Mixed PDCCH Monitoring Capabilities for NR Rel-16 UEs

For NR Rel-16, there are two cell types as follows:

Cell Type 1 (FR1/FR2): configured with a slot-based PDCCH monitoring capability; and Cell Type 2 (FR1 only): configured with a span-based PDCCH monitoring capability.

For NR Rel-16 UEs, there may be configurations for the following cases:

Case 1: all configured scheduling cells belong to cell Type 1;

Case 2: all configured scheduling cells belong to cell Type 2; and

Case 3: at least one scheduling cell belongs to Cell Type 1 and at least one scheduling cell belongs to Cell Type 2.

For the maximum processing capability parameter, such as BD or CCE, the UE may make reporting separately for each supported case. In addition, for each case, all cells may be grouped based on different PDCCH processing capabilities, and the maximum processing capability parameter is reported separately.

Table 1 summarizes a relationship between reporting capabilities of UE and configurable cases for base station:

TABLE 1

Relationship between reporting capabilities of UE and configurable cases for base station:

| UE type | Reporting capability | Allowed operation |
|---|---|---|
| Rel-16 UE | — | Only Case 1 |
| Rel-16 UE | pdcch-Monitoring-r16 | Case 1/Case 2 |
| Rel-16 UE | pdcch-Monitoring-r16<br>pdcch-MonitoringMixed-r16 | Case 1/Case 2/Case 3 |

The following describes in detail the embodiments of this application by using some embodiments and application scenarios thereof with reference to the accompanying drawings.

Figure 2:
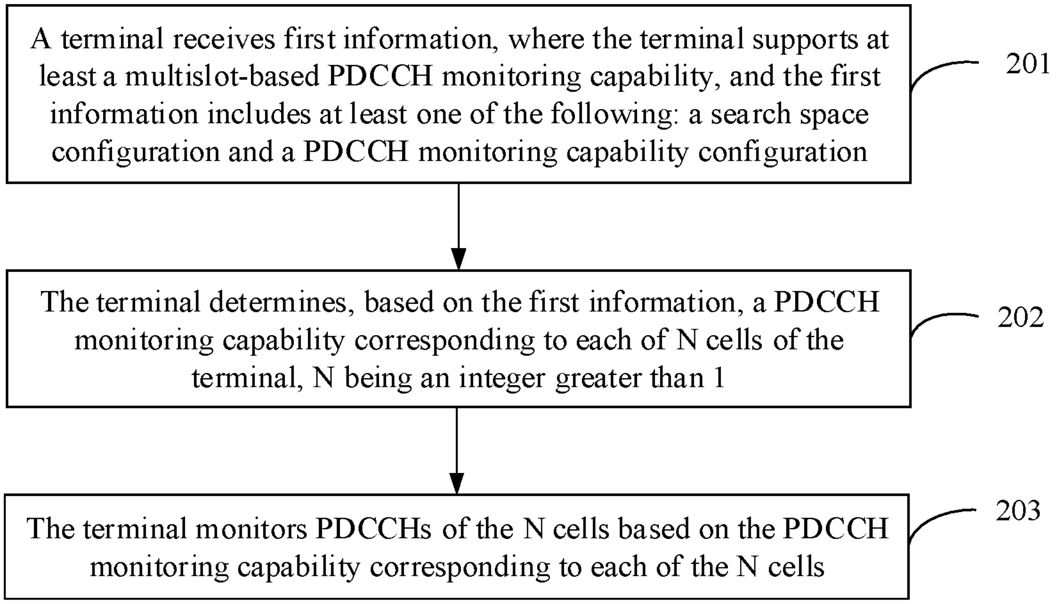
FIG. 2 is a first flowchart of a PDCCH monitoring method according to an embodiment of this application.

Referring to FIG. 2, FIG. 2 is a first flowchart of a PDCCH monitoring method according to an embodiment of this application. The PDCCH monitoring method of FIG. 2 may be performed by a terminal. As shown in FIG. 2, the PDCCH monitoring method may include the following steps.

Step 201. The terminal receives first information, where the terminal supports at least a multislot-based PDCCH monitoring capability, and the first information includes at least one of the following: a search space configuration or a PDCCH monitoring capability configuration.

In specific implementation, a network-side device may send the first information to the terminal to configure an SS for the terminal via the search space configuration and/or to configure PDCCH monitoring capabilities corresponding to cells of the terminal via the PDCCH monitoring capability configuration. A PDCCH monitoring capability corresponding to a cell can be understood as: a PDCCH monitoring capability of the terminal in the cell.

In this embodiment of this application, the terminal supports a multislot-based PDCCH monitoring capability, that is, the PDCCH monitoring capability may be defined based on the multislot granularity. Multislot may be understood as at least two slots.

In implementation, the supporting the multislot-based PDCCH monitoring capability may be specifically expressed as:

supporting a slot-group-based PDCCH monitoring capability; and supporting a slot-level-span-based PDCCH monitoring capability.

That is, in this embodiment of this application, the PDCCH monitoring capability may be defined based on the granularity of slot group or based on the granularity of slot level span. A single slot group may include at least two slots; and a single slot level span may include a plurality of slots. In actual application, the number of slots included in a single slot group and/or the number of slots included in a single slot level span may be reported by the terminal, configured by the network-side device, or predefined by the protocol, which may be specifically determined according to actual situations, and this is not limited in the embodiments of this application.

Step 202: The terminal determines, based on the first information, a PDCCH monitoring capability corresponding to each of N cells of the terminal (N cells for the UE), N being an integer greater than 1.

In specific implementation, in a case that the first information includes a PDCCH monitoring capability configuration, the PDCCH monitoring capability corresponding to each of the N cells may be determined based on the PDCCH monitoring capability configuration.

In a case that the first information does not include a PDCCH monitoring capability configuration, the PDCCH monitoring capability corresponding to each of the N cell may be predefined by the protocol.

Optionally, the PDCCH monitoring capability corresponding to each of the N cell may include at least one of the following:

multislot-based PDCCH monitoring capability;

slot-based PDCCH monitoring capability; or symbol-level-span-based PDCCH monitoring capability.

It can be understood that all the PDCCH monitoring capability corresponding to each of the N cells is a PDCCH monitoring capability supported by the terminal, and that the PDCCH monitoring capability corresponding to each of the N cells may be the same or different, which may be specifically determined according to actual situations, and this is not limited in the embodiments of this application.

Step 203: The terminal monitors PDCCHs of the N cells based on the PDCCH monitoring capability corresponding to each of the N cells.

In specific implementation, the terminal may detect whether search space configurations respectively corresponding to the N cells satisfy the PDCCH monitoring capability corresponding to each of the N cells. In a case of being satisfied, the terminal may monitor the PDCCHs of the N cells based on the search space configurations respectively corresponding to the N cells.

In the PDCCH monitoring method of this application, the terminal is configured with N cells and supports the multislot-based PDCCH monitoring capability; and the terminal may monitor the PDCCHs of the N cells based on the PDCCH monitoring capability corresponding to each of the N cells. It can be learned that the embodiments of this application increase a time granularity for defining the PDCCH monitoring capability, thereby reducing complexity in implementation of terminals.

The following specifically describes implementation of step 203.

Optionally, the monitoring, by the terminal, PDCCHs of the N cells based on the PDCCH monitoring capability corresponding to each of the N cells may include:

determining, by the terminal based on the PDCCH monitoring capability corresponding to each of the N cells, a target limitation corresponding to the N cells, where the target limitation includes at least one of the following: a time domain position limitation for a PDCCH monitoring occasion or a PDCCH processing parameter limitation; and monitoring, by the terminal, the PDCCHs of the N cells based on the target limitation corresponding to the N cells.

In specific implementation, the time domain position limitation for the PDCCH monitoring occasion may specifically include at least one of the following: a limitation for a slot in which the PDCCH monitoring occasion is located; or a limitation for a symbol in which the PDCCH monitoring occasion is located.

A PDCCH processing parameter limitation may specifically include at least one of the following: a BD quantity limitation or a CCE quantity limitation.

During determining of the target limitation corresponding to the N cells, the terminal may monitor the PDCCHs of the N cells using the target limitation corresponding to the N cells in a related-art manner of PDCCH monitoring based on a limitation, which is not described herein.

In the embodiments of this application, the terminal may determine the target limitation corresponding to the N cells by using any one of the following methods.

Method I

Optionally, the determining, by the terminal based on the PDCCH monitoring capability corresponding to each of the N cells, a target limitation corresponding to the N cells includes:

in a case that V cells corresponding to the multislot-based PDCCH monitoring capability are present in the N cells and that V is a positive integer, determining, by the terminal, V first virtual cells equivalent to the V cells, where the first virtual cell corresponds to a slot-based PDCCH monitoring capability or a symbol-level-span-based PDCCH monitoring capability; and determining the target limitation corresponding to the N cells, based on a PDCCH monitoring capability corresponding to the V first virtual cells and a PDCCH monitoring capability corresponding to a first cell; where the first cell includes a cell in the N cells other than the V cells.

In Method I, in a case that cells corresponding to the multislot-based PDCCH monitoring capability are present in the N cells, the terminal may first determine all such cells in the N cells, that is, the V cells.

Then, the terminal may equate all of the V cells to virtual cells corresponding to the slot-based PDCCH monitoring capability or symbol-level-span-based PDCCH monitoring capability, to obtain V first virtual cells, so as to calculate the target limitation corresponding to the N cells based on the V first virtual cells and the first cell.

In this method, because the PDCCH monitoring capabilities corresponding to the V first virtual cells and the first cell are all a slot-based PDCCH monitoring capability or symbol-level-span-based PDCCH monitoring capability, the terminal can calculate the target limitation corresponding to the N cells in a corresponding related-art manner in which a target limitation is calculated for cells with the time-slot-based PDCCH monitoring capability or the symbol-level-span-based PDCCH monitoring capability, thereby reducing complexity in implementation of terminals.

The following describes an equating manner.

Optionally, the determining, by the terminal, V first virtual cells equivalent to the V cells includes:

- mapping, by the terminal, a PDCCH monitoring occasion of a second cell to a frame structure of a third cell, where a first index of a subcarrier spacing (SCS) of the third cell satisfies any one of the following: the first index being predefined, the first index being reported by the terminal or configured by a network-side device, and the first index being equal to a ratio of a second index of an SCS of the first cell to X; and
- determining, by the terminal, the third cell as a first equivalent cell equivalent to the second cell in a case that a PDCCH monitoring occasion of the frame structure of the third cell satisfies a first condition; where
- The second cell is any one of the V cells;
- the first condition is any one of the following: a PDCCH monitoring capability based on a symbol level span of the first index is satisfied; and a PDCCH monitoring capability based on a slot of the first index is satisfied; and
- X satisfies at least one of the following: in a case that the second cell corresponds to a slot-group-based PDCCH monitoring capability, X is the number X1 of slots included in each slot group; or in a case that the second cell corresponds to a slot-level-span-based PDCCH monitoring capability, X is the minimum number X2 of gap slots between consecutive slot level spans.

In specific implementation, the terminal may first determine an index μ' of an SCS, and then select a cell with an SCS of μ' and corresponding to the slot-based PDCCH monitoring capability or the symbol-level-span-based PDCCH monitoring capability as the third cell.

After determining the third cell, the terminal may map the PDCCH monitoring occasion of the second cell to a frame structure of the third cell. Then, it is determined whether a PDCCH monitoring occasion of the frame structure of the third cell satisfies a PDCCH monitoring capability based on a symbol level span or slot for the SCS of μ'. In a case of being satisfied, the second cell may be equated to the third cell, that is, the third cell is an equivalent cell of the second cell.

In this embodiment of this application, the index μ' of the SCS may be reported by the terminal, configured by the network-side device, or predefined by the protocol, or may be determined based on the index μ of the SCS of the second cell.

In a case that the index μ' of the SCS is determined based on the index μ of the SCS of the second cell, μ' and μ may satisfy: μ'=μ/X.

The value of X is related to a specific manifestation form of the PDCCH monitoring capability corresponding to the second cell. In a case that the second cell corresponds to a slot-group-based PDCCH monitoring capability, X is the number X1 of slots included in each slot group; and in a case that the second cell corresponds to a slot-level-span-based PDCCH monitoring capability, X is the minimum number X2 of gap slots between consecutive slot level spans. In actual application, X1 and/or X2 may be reported by the terminal, configured by the network-side device, or predefined by the protocol, It should be noted that the Method I may be used for determining at least one of the following: a time domain position limitation for the PDCCH monitoring occasion corresponding to the N cells; or a PDCCH processing parameter limitation corresponding to the N cells.

Method II

In Method II, the N cells may correspond to J cell groups, J being a positive integer.

In specific implementation, each cell group may include part or all of the N cells. It should be understood that at least one cell differs for different cell groups.

Optionally, the J cell groups satisfy that one cell group corresponds to Z PDCCH monitoring capability types, Z being a positive integer.

In a first implementation, different PDCCH monitoring capability types may be divided into different cell groups.

In a second implementation, a first-type PDCCH monitoring capability and a second-type PDCCH monitoring capability may be divided into one cell group set, and other types of PDCCH monitoring capabilities may be divided into another cell group set.

In a third implementation, all types of PDCCH monitoring capabilities may be divided into one cell group set.

It should be noted that the above implementations are only examples and do not constitute limitation on a manner of determining a cell group.

For ease of understanding, it is assumed that the N cells include cell 1, cell 2, and cell 3. Cell 1 corresponds to a multislot-based PDCCH monitoring capability; cell 2 corresponds to a slot-based PDCCH monitoring capability; and cell 3 corresponds to a symbol-level-span-based PDCCH monitoring capability.

Then, in the foregoing first implementation, the N cells correspond to three cell groups, each cell group including only one cell.

Then, in the foregoing second implementation, the N cells correspond to two cell groups, where one cell group includes two cells and the other cell group includes one cell.

Then, in the foregoing third implementation, the N cells correspond to one cell group, and the cell group includes three cells.

Method II may be used for determining a PDCCH processing parameter limitation corresponding to the N cells. In Method II, a PDCCH processing parameter limitation corresponding to each cell group is determined in a manner related to whether the number of cells included in the cell group is greater than a maximum value of a cell capability parameter corresponding to the cell group (which may also be referred to as a maximum processing capacity cell capacity parameter, $$N_{cells}^{capacility}).$$

In a case that the number of cells included in the cell group is greater than $$N_{cells}^{capacity}$$

corresponding to the cell group, the manner of determining the PDCCH processing parameter limitation corresponding to the cell group is further related to PDCCH monitoring capacity types corresponding to the cells in the cell group, which is specifically described as follows:

Determining Manner 1

Optionally, in a case that the cells in the target cell group all correspond to the multislot-based PDCCH monitoring capability, the PDCCH processing parameter limitation corresponding to the target cell group satisfies at least one of the following:

determining manner 1-1: in a case that all the cells in the target cell group correspond to a slot-group-based PDCCH monitoring capability and that P cells are divided into at least one cell group based on a first rule, a PDCCH processing parameter sum for each slot group of each cell group satisfies a PDCCH processing parameter first-limitation;

determining manner 1-2: in a case that all the cells in the target cell group correspond to a slot-group-based PDCCH monitoring capability and that the P cells are divided into at least one cell group based on a second rule, a PDCCH processing parameter sum for a target slot group of each cell group satisfies the PDCCH processing parameter first-limitation, where the target slot group is a slot group corresponding to an SCS with an index being a maximum value or a minimum value in the cell group; or determining manner 1-3: in a case that all the cells in the target cell group correspond to a slot-level-span-based PDCCH monitoring capability and that the P cells are divided into at least one cell group based on a third rule, a PDCCH processing parameter sum for each slot level span of each cell group satisfies the PDCCH processing parameter first-limitation; where the P cells are cells included in the target cell group, or the P cells include: a second virtual cell that is equivalent to a fourth cell of the target cell group, and a fifth cell in the target cell group other than the fourth cell; and the target cell group is any one cell group in the J cell groups.

In determining manner 1, the cells in the target cell group all correspond to the multislot-based PDCCH monitoring capability, and the terminal may first obtain at least one cell group based on the target cell group, and then determine a PDCCH processing parameter limitation corresponding to each cell group based on the granularity of cell group.

In specific implementation, the terminal may obtain at least one cell group in any one of the following implementations:

Implementation 1: The terminal may directly divide the cells in the target cell group to obtain at least one cell group. In this case, the P cells are cells included in the target cell group.

Implementation 2: The terminal first equates part or all of the cells in the target cell group to virtual cells, and then divides transformed virtual cells and untransformed virtual cells into cell groups. In this case, the P cells may include: a second virtual cell equivalent to a fourth cell of the target cell group, and a fifth cell in the target cell group other than the fourth cell. In specific implementation, the number of cells for the fourth cell is equal to the number of cells for the second virtual cell, and the fourth cell includes at least one cell.

In addition, for different implementation forms of the multislot-based PDCCH monitoring capability, cell groups may be divided in different manners; and for a same implementation form of the multislot-based PDCCH monitoring capability, cell groups may be divided in a same manner or different manners.

The implementation of the determining manner 1 is described below with reference to the determining manner 1-1 to the determining manner 1-3.

In determining manner 1-1 and determining manner 1-2, the cells in the target cell group all correspond to the slot-group-based PDCCH monitoring capability. However, in determining manner 1-1 and determining manner 1-2, the terminal performs division of cell groups based on different rules, and therefore, the PDCCH processing parameter limitations corresponding to the cell groups obtained in determining manner 1-1 and determining manner 1-2 are calculated in different manners.

In determining manner 1-1, the P cells are divided into at least one cell group based on a first rule. The first rule may be reported by the terminal, configured by a network-side device, or predefined by a protocol. Optionally, the first rule may include:

cells with both a same first value and a same subcarrier spacing (SCS) index are divided into one cell group; where the first value includes at least one of the following:

the number X1 of slots included in a slot group;

a time offset O1 for a start slot of the slot group; or the number Y1 of configurable PDCCH monitoring occasions within the slot group.

That is, the terminal may divide cells with an SCS of μ and with at least one of X1, Y1, or O1 being the same into one group.

In this case, a PDCCH processing parameter sum for each slot group of each cell group satisfies the PDCCH processing parameter first-limitation.

In this embodiment of this application, the first limitation may be reported by the terminal, configured by the network-side device, or predefined by the protocol. In specific implementation, the first limitation may be expressed as: a target value, and the target value is determined based on at least one of the following:

$$N_{cells}^{cap\text{-}r17}:$$

a maximum processing cell capacity parameter limitation corresponding to the cell group;

$$M_{PDCCH}^{max(X,Y),\mu}:$$

a maximum PDCCH monitoring processing parameter limitation for a single cell in a cell group;

$$N_{cells,r17}^{DL,(X,Y),\mu}:$$

a total number of cells scheduled in the cell group; or $$\sum_{j=5}^{6} N_{cells,r17}^{DL,j}:$$

the number of cell group.

It should be noted that for different cell group, $$N_{cells}^{cap\text{-}r17} \text{ and/or } \sum_{j=5}^{6} N_{cells,r17}^{DL,j}$$

may be the same or different; and for different cell groups, $$M_{PDDCH}^{max,(X,Y),\mu} \text{ and/or } N_{cells,r17}^{DL,(X,Y),\mu}$$

may be the same or different.

Optionally, the target value may be calculated according to the following rounddown formula:

$$\text{Target value} = \left\lfloor N_{cells}^{cap\text{-}r17} \cdot M_{PDCCH}^{max,(X,Y),\mu} \cdot N_{cells,r17}^{DL,(X,Y),\mu} / \sum_{j=5}^{6} N_{cells,r17}^{DL,j} \right\rfloor$$

That is, the target value is a rounddown value of $$N_{cells}^{cap\text{-}r17} \cdot M_{PDCCH}^{max,(X,Y),\mu} \cdot N_{cells,r17}^{DL,(X,Y),\mu} / \sum_{j=5}^{6} N_{cells,r17}^{DL,j}.$$

In a case that the PDCCH processing parameter is expressed as the number of BDs, the PDCCH processing parameter sum for each slot group of each cell group satisfies the PDCCH processing parameter first-limitation, which may be expressed as follows: the total number of BDs for each slot group of each cell group is less than or equal to the target value.

In a case that the PDCCH processing parameter is expressed as the number of CCEs, the PDCCH processing parameter sum for each slot group of each cell group satisfies the PDCCH processing parameter first-limitation, which may be expressed as follows: the total number of CCEs for each slot group of each cell group is less than or equal to the target value.

In determining manner 1-2, the P cells are divided into at least one cell group based on a second rule. The second rule may be reported by the terminal, configured by the network-side device, or predefined by the protocol. The second rule may divide cells with both an SCS of ρ and at least one of X1, O1, or Y1 satisfying a specific condition into one group. The condition may be reported by the terminal, configured by the network-side device, or predefined by the protocol.

Optionally, the second rule may include:

cells with a same second value are divided into one cell group; where the second value includes at least one of the following:

A: a ratio of the number X1 of slots included in a slot group of a cell to an SCS index of the cell;

B: a ratio of a time offset O1 for a start slot of the slot group of the cell to the SCS index of the cell; or C: a ratio of the number Y1 of configurable PDCCH monitoring occasions within the slot group of the cell to the SCS index of the cell.

That is, the terminal may divide cells with an SCS of μ and with at least one of A, B, or C being the same into one group.

In this case, the PDCCH processing parameter sum for a target slot group of each cell group satisfies the PDCCH processing parameter first-limitation, and the target slot group is one slot group in the cell group, which is specifically a slot group corresponding to an SCS with an index being a maximum or minimum value in the cell group. That is, the PDCCH processing parameter sum for slot groups corresponding to the largest or smallest SCS indexes in each cell group satisfies the PDCCH processing parameter first-limitation.

In a case that the PDCCH processing parameter is expressed as the number of BDs, the PDCCH processing parameter sum for a target slot group of each cell group satisfies the PDCCH processing parameter first-limitation, which may be expressed as follows: the total number of BDs for a target slot group of each cell group is less than or equal to the target value.

In a case that the PDCCH processing parameter is expressed as the number of CCEs, the PDCCH processing parameter sum for a target slot group of each cell group satisfies the PDCCH processing parameter first-limitation, which may be expressed as follows: the total number of CCEs for a target slot group of each cell group is less than or equal to the target value.

In determining manner 1-3, the cells in the target cell group all correspond to the slot-level-span-based PDCCH monitoring capability.

The P cells are divided into at least one cell group based on a third rule. The third rule may be reported by the terminal, configured by the network-side device, or predefined by the protocol.

Optionally, the third rule may include:

cells with both a same third value and a same subcarrier spacing (SCS) index are divided into one cell group; where the third value includes at least one of the following:

the minimum number X2 of gap slots between consecutive slot level spans;

the maximum number Y2 of consecutive slots for each slot level span.

That is, cells with an SCS of ρ and with at least one of X2 or Y2 being the same are divided into one group.

In this case, a PDCCH processing parameter sum for each slot level span of each cell group satisfies the PDCCH processing parameter first-limitation.

In a case that the PDCCH processing parameter is expressed as the number of BDs, the PDCCH processing parameter sum for each slot level span of each cell group satisfies the PDCCH processing parameter first-limitation, and may be expressed as follows: the total number of BDs for each slot level span of each cell group is less than or equal to the target value.

In a case that the PDCCH processing parameter is expressed as the number of CCEs, the PDCCH processing parameter sum for each slot level span of each cell group satisfies the PDCCH processing parameter first-limitation, and may be expressed as follows: the total number of CCEs for each slot level span of each cell group is less than or equal to the target value.

In addition, in the determining manner 1-3, optionally, the PDCCH processing parameter limitation corresponding to the target cell group may further satisfy at least one of the following:

a) in a case that a slot set in which a PDCCH monitoring occasion of a first cell group is located satisfies an (X2,Y2) limitation, a PDCCH processing parameter sum for each slot level span of the first cell group after collection satisfies the PDCCH processing parameter first-limitation; or b) in a case that the slot set in which the PDCCH monitoring occasion of the first cell group is located does not satisfy the (X2,Y2) limitation, a PDCCH processing parameter sum for any one combination of slot level spans of different cells in the first cell group satisfies the PDCCH processing parameter first-limitation; where the first cell group is any one cell group in the at least one cell group; X2 is the minimum number of gap slots between consecutive slot level spans; and Y2 is the maximum number of consecutive slots for each slot level span.

In a), the slot level span obtained after collection for the first cell group can be understood as a slot level span determined based on combined slots after combination (that is, collection) of slots in which the PDCCH monitoring occasions of the first cell group are located. That is, one slot level span is taken for different cells of the first cell group.

In b), one slot level span is taken for each cell of the first cell group.

Determining Manner 2

Optionally, in a case that the target cell group includes a first part of cells and a second part of cells, that cells in the first part of cells all correspond to a multislot-based PDCCH monitoring capability, and that cells in the second part of cells correspond to a slot-based PDCCH monitoring capability or a symbol-level-span-based PDCCH monitoring capability, the determining, by the terminal based on the PDCCH monitoring capability corresponding to each of the N cells, a target limitation corresponding to the N cells includes:

determining a third virtual cell corresponding to the first part of the cells, where the third virtual cell corresponds to a slot-based PDCCH monitoring capability or a symbol-level-span-based PDCCH monitoring capability; and determining, based on the PDCCH monitoring capability corresponding to the third virtual cell and the PDCCH monitoring capability corresponding to the second part of cells, a PDCCH processing parameter limitation corresponding to the target cell group.

In determining manner 2, the first part of cells in the target cell group corresponds to the multislot-based PDCCH monitoring capability, and the second part of cells corresponds to the symbol-level-span-based or slot-based PDCCH monitoring capability. In this manner, the terminal may first transform the first part of the cells into virtual cells, and then determine, based on the third virtual cell and the second part of the cells, the target limitation corresponding to the N cells.

It should be noted that the manner of determining the PDCCH processing parameter limitation corresponding to the target cell group in determining manner 2 is similar to the manner of determining the target limitation corresponding to the N cells in Method I, both using the manner of determining the corresponding limitation based on a transformed virtual cell and an untransformed cell, and both the transformed virtual cell and the untransformed cell correspond to the symbol-level-span-based or slot-based PDCCH monitoring capability. The difference between the two lies in that the PDCCH processing parameter limitation corresponding to the target cell group is determined in determining manner 2 while the target limitation corresponding to the N cells is determined in Method I.

A PDCCH monitoring capability corresponding to a cell is described below.

Optionally, the PDCCH monitoring capability corresponding to the cell is any one of the following:

a PDCCH monitoring capability corresponding to an active bandwidth part BWP of the cell; and a PDCCH monitoring capability of a virtual cell corresponding to the cell.

In a case that the PDCCH monitoring capability corresponding to the cell is the PDCCH monitoring capability corresponding to the active BWP of the cell, different BWPs of the cell may correspond to a same PDCCH monitoring capability, or may correspond to different PDCCH monitoring capabilities, which may be determined based on actual situations. This is not limited in the embodiments of this application.

In a case that the PDCCH monitoring capability corresponding to the cell is the PDCCH monitoring capability of the virtual cell corresponding to the cell, after determining a PDCCH monitoring capability corresponding to a cell that is predefined by the protocol or configured by the network-side device, the terminal may transform the cell into a virtual cell and then determine a PDCCH monitoring capability corresponding to the virtual cell as the PDCCH monitoring capability corresponding to the cell, that is, updating the PDCCH monitoring capability corresponding to the cell to the PDCCH monitoring capability corresponding to the virtual cell.

As can be learned from the foregoing content, the PDCCH monitoring capability corresponding to the cell may be configured by the network-side device. In this case, optionally, the PDCCH monitoring capability corresponding to the cell is determined based on an SCS.

In this optional implementation, the SCS is in a correspondence with the PDCCH monitoring capability, and therefore, the network-side device may implicitly indicate the PDCCH monitoring capability corresponding to the cell by indicating the SCS. Certainly, it can be understood that in another implementation, the network-side device may explicitly indicate the PDCCH monitoring capability corresponding to the cell.

In this embodiment of this application, before receiving the first information, the terminal may report PDCCH capability information supported by the terminal to the network-side device, so that the network-side device implements the search space configuration and/or the PDCCH monitoring capability configuration for the terminal based on the terminal-supported PDCCH capability information, so as to increase the probability that the SS configurations for the N cells satisfies the PDCCH monitoring capability corresponding to the N cells. Details are described as follows:

Optionally, before the terminal receives the first information, the method may further include:

sending, by the terminal, second information, where the second information is used to indicate PDCCH monitoring capability information of the terminal.

Optionally, the PDCCH monitoring capability information may include at least one of the following:

1) first sub-information for indicating whether the terminal supports a multislot-based PDCCH monitoring capability;

2) second sub-information for indicating whether the terminal supports different PDCCH monitoring capabilities for different bandwidth parts of a same cell;

3) third sub-information for indicating whether the terminal supports different PDCCH monitoring capabilities corresponding to different cells; or 4) a maximum value of G cell capacity parameters, G being a positive integer.

For 1)

Optionally, the first sub-information may be specifically used for indicating at least one of the following:

whether the terminal supports a slot-group-based PDCCH monitoring capability; or whether the terminal supports a slot-level-span-based PDCCH monitoring capability.

Optionally, in a case that the first sub-information indicates that the terminal supports the slot-group-based PDCCH monitoring capability, the PDCCH monitoring capability information may further include at least one of the following:

the number X1 of slots included in a slot group;

a time offset O1 for a start slot of the slot group; or the number Y1 of configurable PDCCH monitoring occasions within the slot group.

Optionally, in a case that the first sub-information indicates that the terminal supports the slot-level-span-based PDCCH monitoring capability, the PDCCH monitoring capability information may further include at least one of the following:

the minimum number X2 of gap slots between consecutive slot level spans;

the maximum number Y2 of consecutive slots for a slot level span;

the number M of slots included in a time unit corresponding to a slot level span; or a time offset O2 for the time unit corresponding to the slot level span.

For 2)

The second sub-information may be used for indicating whether the terminal supports using mixed PDCCH monitoring capabilities for different bandwidth parts of a same cell.

For 3), the third sub-information is used for indicating whether the terminal supports using mixed PDCCH monitoring capabilities for different cells.

In specific implementation, the mixed PDCCH monitoring capabilities may include at least two of the following:

multislot-based PDCCH monitoring capability;

slot-based PDCCH monitoring capability; and symbol-level-span-based PDCCH monitoring capability.

For 4)

Optionally, in a case that the PDCCH monitoring capacity information includes the maximum value of G cell capacity parameters, the maximum value of G cell capacity parameters corresponds to a target scenario, and the target scenario includes at least one of the following scenarios:

the N cells all matches a slot-based PDCCH monitoring capacity;

the N cells all matches a symbol-level-span-based PDCCH monitoring capacity;

at least one of the N cells matches the slot-based PDCCH monitoring capability, and at least one cell matches the symbol-level-span-based PDCCH monitoring capability;

the N cells all correspond to the multislot-based PDCCH monitoring capability;

at least one of the N cells corresponds to the multislot-based PDCCH monitoring capability, and at least one cell corresponds to the slot-based PDCCH monitoring capability;

at least one of the N cells corresponds to the multislot-based PDCCH monitoring capability, and at least one cell corresponds to the symbol-level-span-based PDCCH monitoring capability; or at least one of the N cells corresponds to the multislot-based PDCCH monitoring capability, at least one cell corresponds to the slot-based PDCCH monitoring capability, and at least one cell corresponds to the symbol-level-span-based PDCCH monitoring capability.

That is, at least one of the target scenarios may share the maximum value of G cell capacity parameters. It can be understood that the number of scenarios and/or specific scenarios corresponding to a maximum value of capacity parameters of different cells in the maximum value of G cell capacity parameters may be the same or different.

That a cell matches a specific PDCCH monitoring capacity may be understood as: the cell corresponds to the PDCCH monitoring capacity, or a virtual cell equivalent to the cell corresponds to the PDCCH monitoring capacity. For example, that all of the N cells match a slot-based PDCCH monitoring capability can be understood as: all of the N cells correspond to or are equivalent to the slot-based PDCCH monitoring capability.

In specific implementation, for any one of the foregoing scenarios, the terminal may divide the N cells into at least one cell group, and the maximum value of G cell capacity parameters may include a maximum value of cell capacity parameters corresponding to the at least one cell group.

The following describes the time domain position limitation of the PDCCH monitoring occasion of the cell.

First, a limitation for a slot in which the PDCCH monitoring occasion is located is described.

Optionally, in a case that the cell corresponds to the multislot-based PDCCH monitoring capability, the slot in which the PDCCH monitoring occasion of the cell is located satisfies at least one of the following:

in a case that the cell corresponds to a slot-group-based PDCCH monitoring capability, the slot in which the PDCCH monitoring occasion of the cell is located satisfies a first condition; or in a case that the cell corresponds to a slot-level-span-based PDCCH monitoring capability and a slot level span pattern is determined based on a fourth rule, the slot in which the PDCCH monitoring occasion of the cell is located satisfies that: a distance between start slots of consecutive slot level spans is not less than X2 slots, where X2 is the minimum number of gap slots between consecutive slot level spans.

In this optional implementation, a condition to be satisfied for the slot in which the PDCCH monitoring occasion of the cell are located may be different for different implementation forms of the multislot-based PDCCH monitoring capability.

In a case that the cell corresponds to a slot-group-based PDCCH monitoring capability, the terminal may determine a slot group position based on X1 and/or O1, and the slot in which the PDCCH monitoring occasion configured for the cell is located may satisfy a first condition.

Optionally, the first condition may include at least one of the following:

being within the first Y1 slots of a slot group;

being within consecutive Y1 slots in a slot group; or the number of slots in the slot group being not greater than Y1; where Y1 is the number of configurable PDCCH monitoring occasions within the slot group.

The slot group in the first condition may be understood as at least one slot group determined. For example, the slot being within the first Y1 slots of a slot group may be understood as: the slot being within the first Y1 slots of a determined slot group.

In a case that the cell corresponds to a slot-level-span-based PDCCH monitoring capability, a slot level span pattern, that is, a span pattern based on the slot granularity, can be determined according to the fourth rule based on a position of the slot in which the PDCCH monitoring occasion is located. In this case, the slot in which the PDCCH monitoring occasion is located may satisfy that a distance between start slots of any consecutive slot level spans is not less than X2 slots.

Optionally, in a case that a slot level span corresponds to Q time units and Q is an integer greater than 1, the fourth rule includes at least one of the following:

rule 1: in a first time unit, a start position of the 1st slot level span is a first slot in the first time unit, the first slot being the 1st slot configured with a PDCCH monitoring occasion in the first time unit; a start position of the (i+1)-th slot level span is a second slot, the second slot being configured with a PDCCH monitoring occasion and being different from the 1st slot in the i-th slot level span; and the maximum length of the slot level span is Y2 slots; or rule 2: in the first time unit, the start position of the 1st slot level span is a third slot in the first time unit, the third slot having a same index as a fourth slot and the fourth slot being a slot with a smallest index in slots configured with PDCCH monitoring occasions in the Q time units; the start position of the (i+1)-th slot level span is a second slot, the second slot being configured with a PDCCH monitoring occasion and being different from the 1st slot of the i-th slot level span; and the maximum length of the slot level span is Y2 slots; where the first time unit is any one of the Q time units; Y2 is the maximum number of consecutive slots in a slot level span; and i is a positive integer.

In rule 1, a start position of the 1st slot level span in each time unit is the 1st slot configured with a PDCCH monitoring occasion in the time unit, that is, a first slot of the time unit;

therefore, a span pattern based on the slot granularity may be the same or different for different time units in the Q time units, depending on the first slot of each time unit. For any two time units, if first slots of the two time units are different, the span pattern based on the slot granularity is different for the two time units; or if the first slots of the two time units are the same, the span pattern based on the slot granularity may be the same for the two time units.

In rule 2, a start position of the 1st slot level span in each time unit is a slot whose index is the same as an index of the fourth slot, and therefore the start position of the 1st slot level span in each time unit is the same. In this way, the span pattern based on the slot granularity is the same for different time units in the Q time units, that is, the span pattern based on the slot granularity is repeated in each time unit of the Q time units.

Secondly, a limitation for a symbol in which the PDCCH monitoring occasion is located is described.

Optionally, in a case that the cell corresponds to the multislot-based PDCCH monitoring capability, a symbol in which a PDCCH monitoring occasion of a cell is located satisfies at least one of the following:

the symbol in which the PDCCH monitoring occasion of the cell is located satisfies a second condition; or in a case that a symbol level span pattern is determined based on a fifth rule, a distance between the symbol in which the PDCCH monitoring occasion of the cell is located and a start symbol of consecutive symbol level spans is not less than X' symbols, where X' is a positive integer.

In this optional implementation, the limitation for the symbol in which the PDCCH monitoring occasion is located may be implemented at a single symbol granularity or at a single symbol level span granularity. For different granularities, a condition to be satisfied by the symbol in which the PDCCH monitoring occasion is located may be different, which is specifically described as follows:

In a case that the limitation for the symbol in which the PDCCH monitoring occasion is located is implemented at the single symbol granularity, the symbol in which the PDCCH monitoring occasion is located may satisfy a second condition.

Optionally, the second condition may include at least one of the following:

within the first Y' symbols of a slot;

within consecutive Y' symbols of the slot; or the number of symbols in the slot is not greater than Y'; where Y' is a positive integer. Y' may be reported by the terminal, configured by the network-side device, or predefined by the protocol.

The slot in the second condition may be understood as any slot in which the PDCCH monitoring occasion is located.

In a case that the limitation for the symbol in which the PDCCH monitoring occasion is located is implemented at the granularity of single symbol level span, a symbol level span pattern, namely a span pattern at the symbol granularity, may be determined based on the fifth rule and the symbol in which the PDCCH monitoring occasion is located. In this case, the symbol in which the PDCCH monitoring occasion is located may satisfy that a distance between start symbols of any consecutive symbol level span is not less than X' symbols.

Optionally, in a case that the symbol level span corresponds to K time units and K is an integer greater than 1, the fifth rule includes at least one of the following:

rule 3: in a second time unit, a start position of the 1st symbol level span is a first symbol in the second time unit, the first symbol being the 1st symbol configured with a PDCCH monitoring occasion in the first time unit; a start position of the (i+1)-th symbol level span is a second symbol, the second symbol being configured with a PDCCH monitoring occasion and being different from the 1st symbol in the i-th symbol level span; and the maximum length of the symbol level span is Y' symbols; or rule 4: in the second time unit, the start position of the 1st symbol level span is a third symbol in the second time unit, the third symbol having a same index as a fourth symbol and the fourth symbol being a symbol with a smallest index in symbols configured with PDCCH monitoring occasions in the K time units; the start position of the (i+1)-th symbol level span is a second symbol, the second symbol being configured with a PDCCH monitoring occasion and being different from the 1st symbol of the i-th symbol level span; and the maximum length of the symbol level span is Y' symbols; where the second time unit is any one of the K time units, Y' is a positive integer, and i is a positive integer.

In rule 3, because the start position of the 1st symbol level span in each time unit is the 1st symbol configured with the PDCCH monitoring occasion in the time unit, which is the first symbol of the time unit, and the span pattern at the symbol granularity may be the same or different for different time units of the Q time units, depending on the first symbol of each time unit. For any two time units, if the first symbols of the two time units are different, the span pattern at the symbol granularity is different for the two time units; or if the first symbols of the two time units are the same, the span pattern at the symbol granularity may be the same for the two time units.

In rule 4, the start position of the 1st symbol level span in each time unit is a symbol with a same index as the fourth symbol, and therefore the start position of the 1st symbol level span in each time unit is the same. In this way, the span pattern at the symbol granularity is the same for different time units in the Q time units, that is, the span pattern at the symbol granularity is repeated for each time unit in the Q time units.

In this embodiment of this application, in a case that the cell corresponds to the multislot-based PDCCH monitoring capability, the PDCCH processing parameter limitation for the cell may further be determined in the following manner:

Optionally, the PDCCH processing parameter limitation for the cell satisfies at least one of the following:

- in a case that the cell corresponds to the slot-group-based PDCCH monitoring capability, a PDCCH processing parameter sum for each slot group of the cell satisfies a PDCCH processing parameter first-limitation; or
- in a case that the cell corresponds to the slot-level-span-based PDCCH monitoring capability and a slot level span pattern is determined based on a fifth rule, a PDCCH processing parameter limitation sum for each slot level span of the cell satisfies the PDCCH processing parameter first-limitation.

In a case that the cell corresponds to the slot-group-based PDCCH monitoring capability, the terminal may determine the slot group position based on X1 and/or O1, and the PDCCH processing parameter sum for the search space configured for each slot group satisfies the first limitation.

In a case that the cell corresponds to the slot-level-span-based PDCCH monitoring capability, a span pattern at the slot granularity may be determined based on the fourth rule and a position of the slot in which the PDCCH monitoring occasion is located. In this case, the PDCCH processing parameter sum for the search space configured for each slot level span satisfies the first limitation.

In this optional implementation, the PDCCH processing parameter limitation for each cell satisfies a PDCCH monitoring processing parameter limitation corresponding to a PDCCH monitoring capacity determined for each cell.

As can be learned from the foregoing content, the terminal in this embodiment of this application supports at least the multislot-based PDCCH monitoring capability. In this embodiment of this application, optionally, a limitation for the multislot-based PDCCH monitoring capability supported may be added; for specific implementation, whether the limitation is present can be predefined by the protocol or reported by the terminal. The following specifically describes the limitation.

Optionally, in a case that U cells in the N cells correspond to the multislot-based PDCCH monitoring capability and U is an integer greater than 1, the U cells satisfy a third condition.

In this optional implementation, the limitation for the multislot-based PDCCH monitoring capability supported is specifically expressed as a limitation for the U cells, so as to make the U cells satisfy the third condition to implement consistency.

In specific implementation, at least two cells in the U cells have a same SCS, or all SCSs are different. For different cases, the third condition may be different.

For cells with a same SCS, optionally, the third condition may include at least one of the following:

- in a case that the U cells correspond to the slot-group-based PDCCH monitoring capability, the third condition includes at least one of the following: the number X1 of slots included in a slot group is the same; a time offset O1 for a start slot of the slot group is the same; or the number Y1 of configurable PDCCH monitoring occasions within the slot group is the same; or
- in a case that the U cells correspond to the slot-level-span-based PDCCH monitoring capability, the third condition includes at least one of the following: X2 is the same; Y2 is the same; or (X2,Y2) is the same for the U cells and a set of slots in which the PDCCH monitoring occasions of the U cells are located satisfies an (X2,Y2) limitation; where X2 is the minimum number of gap slots between consecutive slot level spans, and Y2 is the maximum number of consecutive slots for each of the slot level spans.

That is, in a case that the U cells correspond to the slot-group-based PDCCH monitoring capability, the consistency between the cells with the same SCS may be expressed as at least one of X1, O1, or Y1 being the same for the cells.

In a case that the U cells correspond to the slot-level-span-based PDCCH monitoring capability, the consistency between the cells with the same SCS may include at least one of the following: X2 for the cells is the same; Y2 for the cells is the same; or for cells with the same (X2,Y2), a set of slots in which the PDCCH monitoring occasions of the cells are located satisfies the (X2,Y2) limitation. Further, any span is within the Y2 slots.

For cells with different SCSs, optionally, in a case that a fifth cell and a sixth cell with different SCSs are present in the U cells, the third condition includes at least one of the following:

- the sixth cell is a virtual cell of the fifth cell; or
- a first ratio is equal to a second ratio; where
- the first ratio is a ratio of a fourth value to an SCS index of the fifth cell, and the second ratio is a ratio of the fourth value to an SCS index of the sixth cell.

The fourth value includes at least one of the following:

- the number X1 of slots included in a slot group;
- a time offset O1 for a start slot of the slot group; or
- the number Y1 of configurable PDCCH monitoring occasions within the slot group.

For ease of understanding, it is assumed that the fifth cell has an SCS of $\mu 1$ and the sixth cell has an SCS of $\mu 2$.

In this case, consistency between the fifth cell and the sixth cell may include at least one of the following:

- the sixth cell is a virtual cell of the fifth cell;
- X1 values of the fifth cell and the sixth cell satisfy a specific condition, for example, $X1/\mu 1$ of the fifth cell$=X1/\mu 2$ of the sixth cell;
- O1 values of the fifth cell and the sixth cell satisfy a specific condition, for example, $O1/\mu 1$ of the fifth cell$=O1/\mu 2$ of the sixth cell; or
- Y1 values of the fifth cell and the sixth cell satisfy a specific condition, for example, $Y1/\mu 1$ of the fifth cell$=Y1/\mu 2$ of the sixth cell.

In specific implementation, the sixth cell is a virtual cell of the fifth cell, which may be manifested as follows: in a case that the PDCCH monitoring occasion of the fifth cell is mapped onto the frame structure of the sixth cell, a PDCCH monitoring occasion of the frame structure of the sixth cell satisfies the multislot-based PDCCH monitoring capability based on the fourth index. In this case, both the cell and its equivalent virtual cell correspond to the multislot-based PDCCH monitoring capability.

As can be learned from the foregoing content, different cells in this embodiment of this application may support mixed PDCCH monitoring capabilities, and different BWPs of a same cell may support mixed PDCCH monitoring capabilities. In this embodiment of this application, optionally, a limitation on the mixed PDCCH monitoring capabilities supported may be added; for specific implementation, whether the limitation is present can be predefined by the protocol or reported by the terminal. The following specifically describes the limitation.

Optionally, the N cells include at least two PDCCH monitoring capabilities in a case that at least one of the following is satisfied:

- supporting to determine a seventh cell as a virtual cell of an eighth cell; or
- supporting to determine the eighth cell as a virtual cell of the seventh cell; where
- the seventh cell corresponds to a multislot-based PDCCH monitoring capability; and
- the seventh cell corresponds to the slot-based PDCCH monitoring capability or the symbol-level-span-based PDCCH monitoring capability.

Supporting to determine the seventh cell as the virtual cell of the eighth cell can be understood as follows: a cell having the multislot-based PDCCH monitoring capability is consistent/transformable with a cell having the symbol-level-span-based/slot-based PDCCH monitoring capability.

In this case, for a cell with an SCS of μ and a multislot-based PDCCH monitoring capability, all its configured PDCCH monitoring occasions are mapped onto a frame structure for an SCS of μ', which satisfies the symbol-level-span-based/slot-based PDCCH monitoring capability for the SCS of μ' reported by the UE.

Supporting to determine the eighth cell as the virtual cell of the seventh cell can be understood as follows: a cell having the symbol-level-span-based/slot-based PDCCH monitoring capability is consistent/transformable with a cell having the multislot-based PDCCH monitoring capability.

In this case, for a cell with an SCS of μ and a symbol-level-span-based/slot-based PDCCH monitoring capability, all its configured PDCCH monitoring occasions are mapped onto a frame structure for an SCS of μ', which satisfies the multislot-based PDCCH monitoring capability for the SCS of μ' reported by the UE.

Figure 3:
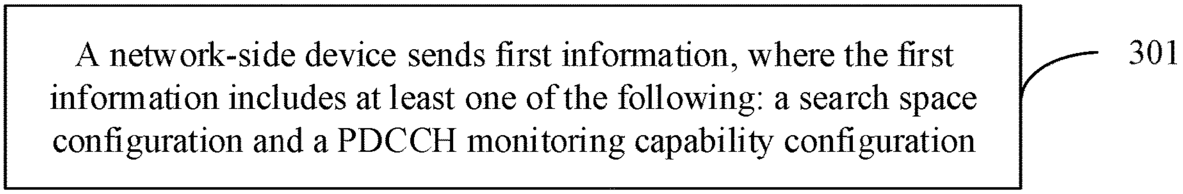
FIG. 3 is a second flowchart of a PDCCH monitoring method according to an embodiment of this application.

Referring to FIG. 3, FIG. 3 is a second flowchart of a PDCCH monitoring method according to an embodiment of this application. The PDCCH monitoring method of FIG. 3 is performed by a network-side device. As shown in FIG. 3, the PDCCH monitoring method may include the following steps.

Step 301: The network-side device sends first information, where the first information includes at least one of the following: a search space configuration or a PDCCH monitoring capability configuration.

Optionally, before the network-side device sends the first information, the method further includes:

- receiving, by the network-side device, second information, where the second information is used to indicate PDCCH monitoring capability information of a terminal.

Optionally, the PDCCH monitoring capability information includes at least one of the following:

- first sub-information for indicating whether the terminal supports a multislot-based PDCCH monitoring capability;
- second sub-information for indicating whether the terminal supports different PDCCH monitoring capabilities for different bandwidth parts of a same cell;
- third sub-information for indicating whether the terminal supports different PDCCH monitoring capabilities corresponding to different cells; or
- a maximum value of G cell capacity parameters, G being a positive integer.

Optionally, the first sub-information is used for indicating at least one of the following:

- whether the terminal supports a slot-group-based PDCCH monitoring capability; or
- whether the terminal supports a slot-level-span-based PDCCH monitoring capability.

Optionally, in a case that the first sub-information indicates that the terminal supports the slot-group-based PDCCH monitoring capability, the PDCCH monitoring capability information further includes at least one of the following:

- the number X1 of slots included in a slot group;
- a time offset O1 for a start slot of the slot group; or
- the number Y1 of configurable PDCCH monitoring occasions within the slot group.

Optionally, in a case that the first sub-information indicates that the terminal supports the slot-level-span-based PDCCH monitoring capability, the PDCCH monitoring capability information further includes at least one of the following:

- the minimum number X2 of gap slots between consecutive slot level spans;
- the maximum number Y2 of consecutive slots for a slot level span;
- the number M of slots included in a time unit corresponding to a slot level span; or
- a time offset O2 for the time unit corresponding to the slot level span.

Optionally, in a case that the PDCCH monitoring capacity information includes the maximum value of G cell capacity parameters, the maximum value of G cell capacity parameters corresponds to a target scenario, and the target scenario includes at least one of the following scenarios:

- the N cells all matches a slot-based PDCCH monitoring capacity;
- the N cells all matches a symbol-level-span-based PDCCH monitoring capacity;
- at least one of the N cells matches the slot-based PDCCH monitoring capability, and at least one cell matches the symbol-level-span-based PDCCH monitoring capability;
- the N cells all correspond to the multislot-based PDCCH monitoring capability;
- at least one of the N cells corresponds to the multislot-based PDCCH monitoring capability, and at least one cell corresponds to the slot-based PDCCH monitoring capability;
- at least one of the N cells corresponds to the multislot-based PDCCH monitoring capability, and at least one cell corresponds to the symbol-level-span-based PDCCH monitoring capability; or
- at least one of the N cells corresponds to the multislot-based PDCCH monitoring capability, at least one cell corresponds to the slot-based PDCCH monitoring capability, and at least one cell corresponds to the symbol-level-span-based PDCCH monitoring capability.

It should be noted that this embodiment is used as an embodiment of the network-side device corresponding to the method embodiment in FIG. 2. Therefore, reference may be made to the related descriptions in the foregoing method embodiment in FIG. 2, and the same beneficial effects can be achieved. To avoid repetition, details are not described herein again.

It should be noted that various optional implementations described in this embodiment of this application may be implemented in combination or may be implemented independently, which is not limited in this embodiment of this application.

For ease of understanding, descriptions are provided by using an example.

In this example, the terminal may perform at least one of the following:

1. Reporting or predefining PDCCH monitoring capability information, where the terminal supports at least the multislot-based PDCCH monitoring capability;

receiving from a base station a search space configuration and/or a PDCCH monitoring capability configuration for a plurality of cells, and determining a PDCCH monitoring capability type for each scheduling cell, where the configured PDCCH monitoring capability for the plurality of cells satisfies the PDCCH monitoring capability of the terminal; or performing PDCCH monitoring based on a search space configured by the base station, where PDCCHs configured in the search spaces of the plurality of cells satisfy at least one of the following conditions:

a time domain position of a configured PDCCH monitoring occasion satisfies a first condition; or a configured PDCCH processing parameter (for example, the number of blind detections or the number of CCEs) satisfies a second condition.

2. The PDCCH monitoring capability information includes at least one of the following:

whether the multislot-based PDCCH monitoring capability is supported may be explicitly or implicitly indicated (for example, whether a specified SCS is supported);

whether a fixed-slot-group-based PDCCH monitoring capability is supported; and if so, one or more of the following are included:

a size X of a fixed slot group;

a time offset O of a start slot of the fixed slot group;

the number Y of configurable PDCCH monitoring occasions within the fixed slot group;

whether a slot-granularity-span-based PDCCH monitoring capability is supported; and if so, one or more of the following are included:

the minimum number X of gap slots between consecutive spans based on the slot granularity;

the maximum number Y of consecutive slots for a span based on the slot granularity;

the number M of slots included in a time unit for the span based on the slot granularity;

a time offset O for the time unit of the span based on the slot granularity;

whether mixed PDCCH monitoring capabilities are supported for different BWPs of a same cell; or whether mixed PDCCH monitoring capabilities are used for different cells.

The mixed PDCCH monitoring capabilities include one or more of any combination of multislot-based, slot-based, and/or symbol-level-span-based PDCCH monitoring capabilities, for example:

multislot-based+slot-based PDCCH monitoring capabilities;

multislot-based+symbol-level-span-based PDCCH monitoring capabilities; and multislot-based+slot-based+symbol-level-span-based PDCCH monitoring capabilities.

3. The PDCCH monitoring capacity information includes one or more maximum processing capability cell capacity parameters, and for at least one cell group in at least one of the following scenarios, a grouping manner of the cell group is using cells with one or more specific PDCCH monitoring capacity types (for example, cells with different PDCCH monitoring capacity types are used as one set):

all cells use or are equivalent to the slot-based PDCCH monitoring capability;

all cells use or are equivalent to the symbol-level-span-based PDCCH monitoring capability;

at least one cell uses or is equivalent to the slot-based PDCCH monitoring capability, and at least one cell uses or is equivalent to the symbol-level-span-based PDCCH monitoring capability;

all cells use the multislot-based PDCCH monitoring capability;

at least one cell uses the multislot-based PDCCH monitoring capability and at least one cell uses the slot-based PDCCH monitoring capability;

at least one cell uses the multislot-based PDCCH monitoring capability and at least one cell uses the symbol-level-span-based PDCCH monitoring capability; and at least one cell uses the multislot-based PDCCH monitoring capacity, at least one cell uses the slot-based PDCCH monitoring capacity, and at least one cell uses the symbol-level-span-based PDCCH monitoring capacity.

The plurality of scenarios may share one or more maximum processing capability cell capacity parameters.

4. The determining the PDCCH monitoring capacity type for each cell includes at least one of the following:

determining the PDCCH monitoring capacity type based on a PDCCH monitoring capacity configured for the cell by the base station; or using a PDCCH monitoring capability type of an active BWP of the cell as the PDCCH monitoring capability type of the cell, where the PDCCH monitoring capability type of the active BWP may be explicitly configured by the base station or implicitly obtained through other configurations (for example, SCS configuration).

The foregoing two cells determined as having an SCS of $\mu$ and a multislot-based PDCCH monitoring capability may be equivalent to virtual cells having an SCS of $\mu'$ and a symbol-level-span-based/slot-based PDCCH monitoring capability. In this case, the PDCCH monitoring capability type of the cell is determined to be the PDCCH monitoring type of the virtual cell, and subsequent processing such as calculation of maximum processing capability parameter BD/CCE is performed based on both the virtual cells and the cells with the symbol-level-span-based/slot-based PDCCH monitoring capability.

The equating manner may be: for a cell with an SCS of $\mu$ and a multislot-based PDCCH monitoring capability, all its configured PDCCH monitoring occasions are mapped onto a frame structure for an SCS of μ', which satisfies the symbol-level-span-based/slot-based PDCCH monitoring capability for the SCS of μ' reported by the UE. μ' is predefined (for example, 120 KHz), or μ' is equal to μ/X.

5. The slot in which the PDCCH monitoring occasion configured for the cell with the multislot-based PDCCH monitoring capability is located satisfies at least one of the following conditions:

For the fixed-slot-group-based multislot PDCCH monitoring capability, a position of a slot group is determined based on X and/or O, and the PDCCH monitoring occasion configured is one or more of the following:

a slot is within the first Y slots of a determined slot group;

the slot is within consecutive Y slots of the determined slot group; and the number of slots in the determined slot group in which the slot is located is not greater than Y.

For the slot-level-span-based multislot PDCCH monitoring capability, a span pattern at the slot granularity is determined according to one of the following rules based on a position of the slot in which the PDCCH monitoring occasion is located; in this case, the distance between the start slots of any consecutive spans is not less than X slots.

For each determined time unit, a start position of the 1st span is the 1st slot with a PDCCH monitoring configuration in the time unit, and the maximum length of the span is Y slots;

and a start position of the next span is the 1st slot that has a PDCCH monitoring configuration but is not included in the previous span, and the maximum length of the span is Y slots.

A start position of the 1st span is the 1st slot with a PDCCH monitoring configuration in any time unit, and the maximum length of the span is Y slots; and a start position of the next span is the 1st slot that has a PDCCH monitoring configuration but is not included in the previous span, and the maximum length of the span is Y slots. The span pattern is repeated in each time unit.

6. The symbol in which the PDCCH monitoring occasion configured for the cell with the multislot-based PDCCH monitoring capability is located satisfies at least one of the following conditions:

Based on a specific position within the slot:

symbols for PDCCH monitoring occasions are all within the first Y' symbols of the slot;

symbols for PDCCH monitoring occasions are within consecutive Y' symbols of the slot; and the number of symbols in one slot for symbols for PDCCH monitoring occasions is no more than Y'.

The PDCCH monitoring capability is defined based on a symbol level span, a span pattern at the symbol granularity is determined according to one of the following rules and based on the symbol in which the PDCCH monitoring occasion is located, and the first condition is that a distance between start symbols of any consecutive symbol level span is no less than X' symbols:

for each determined time unit, a start position of the 1st span is the 1st symbol with a PDCCH monitoring configuration in the time unit, and the maximum length of the span is Y' symbols; and a start position of the next span is the 1st symbol that has a PDCCH monitoring configuration but is not included in the previous span, and the maximum length of the span is Y' symbols; and a start position of the 1st span is the 1st symbol with a PDCCH monitoring configuration in any time unit, and the maximum length of the span is Y' symbols; and a start position of the next span is the 1st symbol that has a PDCCH monitoring configuration but is not included in the previous span, and the maximum length of the span is Y' symbols. The span pattern is repeated in each time unit.

7. A PDCCH configured for a cell configured with the multislot-based PDCCH monitoring capability satisfies at least one of the following conditions:

for the fixed-slot-group-based multislot PDCCH monitoring capability, a slot group position is determined based on X and/or O, and a PDCCH processing parameter (for example, BD/CCE) sum for a configured search space on each slot group satisfies a specific condition;

for the slot-level-span-based multislot PDCCH monitoring capability, a span pattern at the slot granularity is determined according to one of the following rules and based on a position of the slot in which the PDCCH monitoring occasion is located, and a PDCCH processing parameter (for example, BD/CCE) sum for a configured search space on each span satisfies a specific condition;

for each determined time unit, a start position of the 1st span is the 1st slot with a PDCCH monitoring configuration in the time unit, and the maximum length of the span is Y slots;

and a start position of the next span is the 1st slot that has a PDCCH monitoring configuration but is not included in the previous span, and the maximum length of the span is Y slots; or a start position of the 1st span is the 1st slot with a PDCCH monitoring configuration in any time unit, and the maximum length of the span is Y slots; and a start position of the next span is the 1st slot that has a PDCCH monitoring configuration but is not included in the previous span, and the maximum length of the span is Y slots. The span pattern is repeated in each time unit.

8. The multislot-based PDCCH monitoring capability supported includes at least one of the following limitations (the limitation is predefined by the protocol or the UE reports whether the limitation is present):

a) A plurality of cells with an SCS of ρ and the multislot-based PDCCH monitoring capability feature consistency.

For the fixed-slot-group-based multislot PDCCH monitoring capability, consistency includes at least one of the following:

a value of X is the same for the plurality of cells;

a value of 0 is the same for the plurality of cells; or a value of Y is the same for the plurality of cells.

For the slot-level-span-based multislot PDCCH monitoring capability, consistency includes at least one of the following:

a value of X is the same for the plurality of cells;

a value of Y is the same for the plurality of cells; or for cells with a same value of (X,Y), a set of slots in which all PDCCH monitoring occasions in the cells are located still satisfy the (X,Y) limitation, and any span pair is within Y slots.

b) A plurality of cells with the multislot-based PDCCH monitoring capability feature consistency.

For cells with a same SCS, refer to a).

For cells with different SCSs, consistency at least includes one of the following:

for a cell with an SCS of μ1 and a multislot-based PDCCH monitoring capability, all its configured PDCCH monitoring occasions are mapped onto a frame structure for an SCS of μ2, which satisfies the multislot-based PDCCH monitoring capability for the SCS of μ2 reported by the UE;

values of X for a cell with an SCS of ρ1 and a cell with an SCS of μ2 satisfy a specific condition, for example, X1/μ1=X2/μ2;

values of 0 for a cell with an SCS of μ1 and a cell with an SCS of μ2 satisfy a specific condition, for example, O1/μ1=O2/μ2; and values of Y for a cell with an SCS of μ1 and a cell with an SCS of μ2 satisfy a specific condition, for example, Y1/μ1=Y2/μ2; and 9. The mixed PDCCH monitoring capabilities supported include at least one of the following limitations (the limitation is predefined by the protocol or the UE reports whether the limitation is present):

a cell with a multislot-based PDCCH monitoring capability and a cell with a symbol-level-span-based/slot-based PDCCH monitoring capability feature consistency/transformability:

for a cell with an SCS of μ and a multislot-based PDCCH monitoring capability, all its configured PDCCH monitoring occasions are mapped onto a frame structure for an SCS of μ' which satisfies the symbol-level-span-based/slot-based PDCCH monitoring capability for the SCS of μ' reported by the UE; or a cell with a symbol-level-span-based/slot-based PDCCH monitoring capability and a cell with a multislot-based PDCCH monitoring capability feature consistency/transformability:

for a cell having an SCS of μ and a symbol-level-span-based/slot-based PDCCH monitoring capability, all its configured PDCCH monitoring occasions are mapped onto a frame structure for an SCS of μ', which satisfies the multislot-based PDCCH monitoring capability for the SCS of μ reported by the UE; where μ' is predefined (for example, 960 KHz), or μ'=μ/X.

10. The first condition includes at least one of the following:

a PDCCH monitoring occasion limitation corresponding to a PDCCH monitoring capability determined for each cell (for example, 5 or 6 is determined to be a multislot-based PDCCH monitoring capability limitation); or whether a limitation (for example, 8 or 9) predefined or indicated in a reported capability is satisfied between the plurality of cells.

11. The second condition includes at least one of the following:

a) A PDCCH configuration satisfies a PDCCH monitoring processing parameter limitation corresponding to a PDCCH monitoring capability determined for each cell (for example, 7 is determined as a limitation for the multislot-based PDCCH monitoring capability); or b) When the number of cells in a cell group exceeds a corresponding maximum processing cell capacity parameter limitation, one or more of corresponding PDCCH monitoring processing parameter limitations need to be satisfied in the cell group:

1) In a case that all cells in the cell group set use the multislot-based PDCCH-based monitoring capability:

for a slot-group-based multislot PDCCH monitoring capability, any one of the following is performed:

cells with at least one of X, O, or Y being the same and with an SCS of μ are divided into one group, where a PDCCH monitoring processing parameter (for example, BD/CCE) sum for each slot group in the cell group satisfies a specific limitation, for example, being less than or equal to a target value;

cells with at least one of X, O, or Y and an SCS of μ satisfying a specific condition (for example, A=X/μ and/or B=Y/μ and/or C=O/μ are the same) are divided into one group, where a PDCCH monitoring processing parameter (for example, BD/CCE) sum for a corresponding slot group (X=A*μ) based on a specific SCS of μ' (maximum or minimum μ) in the cell group meet a specific limitation; and cells with (X,Y,O) satisfying a specific condition and with an SCS of μ are transformed into virtual (X',Y',O') cells with an SCS of μ', and the total limitation for the cell group is calculated based on the transformed virtual cells and untransformed cells according to a.

For a slot-level-span-based multislot PDCCH monitoring capability, any one of the following is performed:

1-1: cells with at least one of X or Y being the same and with an SCS of I are divided into one group, where a PDCCH monitoring processing parameter (for example, BD/CCE) sum for each slot span group in the cell group satisfies a specific limitation;

1-1-1: if all cells in the cell group satisfy a consistency condition, that is, a slot set in which PDCCH monitoring occasions in the cell group are located still satisfies the (X,Y) limitation, the PDCCH monitoring processing parameter (for example, BD/CCE) sum for each slot level span of the cell group after collection satisfies a specific limitation, for example, being less than or equal to the foregoing target value;

1-1-2: otherwise, a PDCCH monitoring processing parameter (for example, BD/CCE) sum for a combination of slot-level spans from different cells in the cell group satisfies a specific limitation; and 1-2: cells with (X,Y,O) satisfying a specific condition and with an SCS of μ are transformed into virtual (X',Y',O') cells with an SCS of μ', and the total limitation for the cell group is calculated based on the transformed virtual cells and untransformed cells according to a.

2) In a case that part of the cells in the cell group have the multislot-based PDCCH monitoring capability and part of the cells have the symbol-level-span-based/slot-based PDCCH monitoring capability.

The cell with the multislot-based PDCCH monitoring capability is equated to the cell with the symbol-level-span-based/slot-based PDCCH monitoring capability, so as to calculate the total PDCCH monitoring capability limitation also based on the cell with the symbol-level-span-based/slot-based PDCCH monitoring capability.

The equating manner is: for a cell with an SCS of μ and the multislot-based PDCCH monitoring capability, all its configured PDCCH monitoring occasions are mapped onto a frame structure for an SCS of μ', which satisfies the symbol-level-span-based/slot-based PDCCH monitoring capability for the SCS of μ' reported by the UE. μ' is predefined (for example, 120 KHz), or μ'=μ/X.

It should be noted that: the foregoing is a terminal-side scheme, to which a network-side scheme corresponds, for example, the network-side device may perform at least one of the following:

receiving PDCCH monitoring capability information reported by the UE;

configuring a PDCCH monitoring capability of the UE for each cell; or performing search space configuration based on the PDCCH monitoring capability.

It should be noted that the foregoing PDCCH monitoring occasion indicates all search spaces or part of search spaces configured for the cell or BWP.

Embodiment 1

Figure 4:
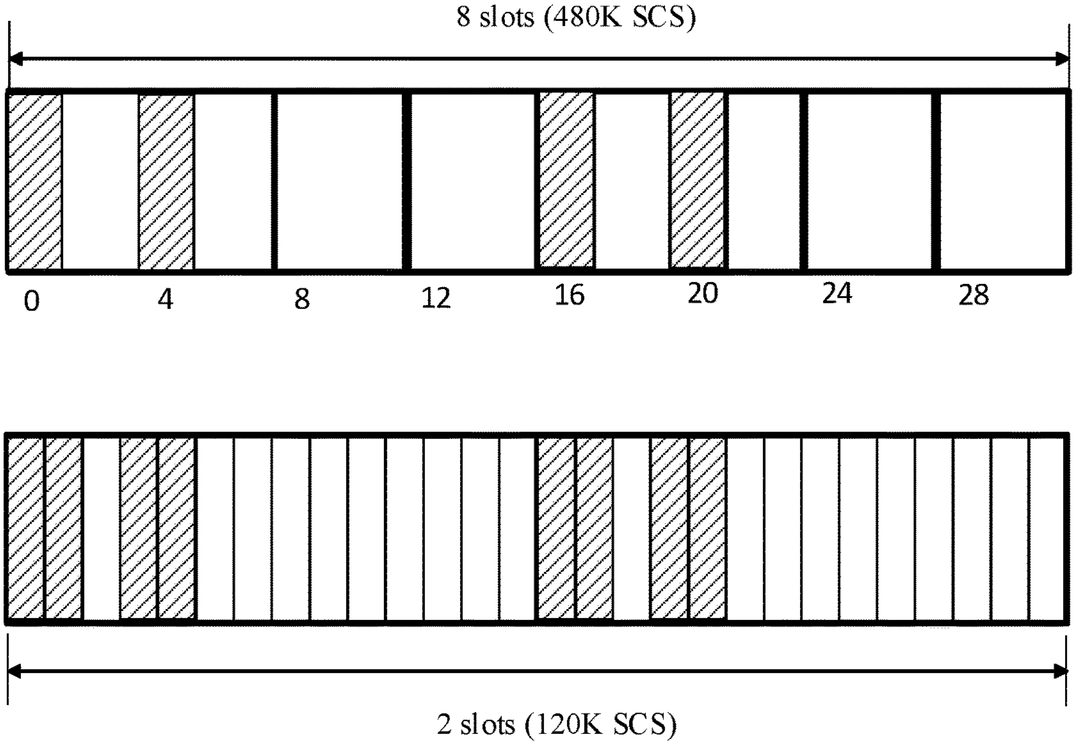
FIG. 4 is a schematic diagram of PDCCH monitoring according to an embodiment of this application.

In a case that a plurality of cells are configured, as shown in FIG. 4, the terminal may map PDCCH monitoring occasions of all cells (or BWPs) with SCSs configured as 480K onto a frame structure for 120K cells (or BWPs), so as to equate the cells (or BWPs) to 120K virtual cells (or BWPs), where a position of the mapped-to PDCCH monitoring occasion needs to satisfy a supported 120K capability reported by the UE, that is, satisfying a 120K symbol-level-span-based or slot-based PDCCH monitoring capability, and BD/CCE limitation calculation processing is performed based on a PDCCH monitoring capability of the virtual cells.

It should be noted that FIG. 4 is only an example, and in other embodiments, the terminal may alternatively map PDCCH monitoring occasions of all cells (or BWPs) with an SCS configured as other values (for example, 960K) onto a frame structure of the 120K cells (or BWPs) to obtain virtual cells of the cells (or BWPs), and then, BD/CCE limitation calculation processing is performed based on a PDCCH monitoring capability of the virtual cells.

Optionally, a limitation for the PDCCH monitoring occasion position is defined based on the multislot-based PDCCH monitoring capability. BD/CCE limitation calculation is performed in the foregoing manner of transformation to a virtual cell.

Embodiment 2

In a case that a plurality of cells are configured, there is a multislot-based PDCCH monitoring capability and a symbol-level-span-based/slot-based PDCCH monitoring capability.

Cells with a same PDCCH monitoring capability type are grouped into one cell group, where the cell group corresponds to one maximum PDCCH monitoring processing cell capacity parameter. When the total number of cells in the cell group is greater than this value:

cells with the multislot-based PDCCH monitoring capacity being based on the same (X,Y) and with an SCS of $\mu$ are divided into one group, where for the cell group, a PDCCH monitoring processing parameter (for example, BD/CCE) sum for each slot group in the cell group satisfies a specific limitation, for example, being less than or equal to the foregoing target value.

This application implements limitation on the PDCCH monitoring occasion position and the monitoring capability parameter by using the following methods in a case that a plurality of cells with the multislot-based PDCCH monitoring capability are at least configured:

Method I: Positions of PDCCH monitoring occasions of a cell with an SCS of $\mu$ and a multislot-based PDCCH monitoring capability are mapped onto a frame structure for an SCS of $\mu'$, so as to be equivalent to a virtual cell with a symbol-level-span-based/slot-based PDCCH monitoring capability and an SCS of $\mu'$ for subsequent implementation of PDCCH monitoring occasion position limitation and PDCCH monitoring capacity (for example, BD/CCE) limitation.

Method II: Cells with different PDCCH monitoring capabilities are divided into one cell group, corresponding maximum PDCCH monitoring capability cell capacity parameters are configured for different cell group in different scenarios, and whether the maximum PDCCH monitoring capability cell capacity has been exceeded is determined for each cell group. If the limitation is exceeded, for a cell group with the multislot-based PDCCH monitoring capability, cells with (X,Y) and SCS satisfying a specific condition are divided into one group, which satisfies the total maximum PDCCH monitoring capability limitation.

It can be learned that, in this embodiment of this application, the terminal supports the multislot-based PDCCH monitoring capability, that is, the terminal may define a PDCCH monitoring capability based on the multislot granularity; in this way, complexity of monitoring by the terminal may be reduced in monitoring of the PDCCH monitoring capability of the terminal in a plurality of cells based on the multislot-based PDCCH monitoring capability.

It should be noted that, for the PDCCH monitoring method provided by the embodiments of this application, the execution body may be a PDCCH monitoring apparatus, or a control module for executing the PDCCH monitoring method in the PDCCH monitoring apparatus. In the embodiments of this application, the PDCCH monitoring method being performed by the PDCCH monitoring apparatus is used as an example to describe the PDCCH monitoring apparatus provided in the embodiments of this application.

Figure 5:
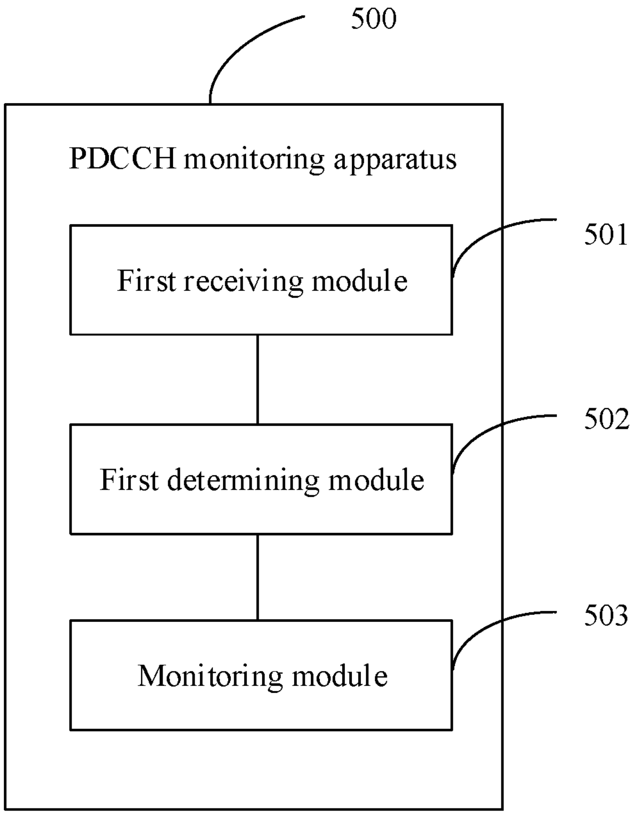
FIG. 5 is a first structural diagram of a PDCCH monitoring apparatus according to an embodiment of this application.

As shown in FIG. 5, the PDCCH monitoring apparatus 500 includes:

a first receiving module 501, configured to receive first information, where the apparatus supports at least a multislot-based PDCCH monitoring capability, and the first information includes at least one of the following: a search space configuration or a PDCCH monitoring capability configuration;

a first determining module 502, configured to determine, based on the first information, a PDCCH monitoring capability corresponding to each of N cells of the terminal, N being an integer greater than 1; and a monitoring module 503, configured to monitor PDCCHs of the N cells based on the PDCCH monitoring capability corresponding to each of the N cells.

Optionally, the monitoring module 503 includes:

a determining submodule, configured to determine, based on the PDCCH monitoring capability corresponding to each of the N cells, a target limitation corresponding to the N cells, where the target limitation includes at least one of the following: a time domain position limitation for a PDCCH monitoring occasion or a PDCCH processing parameter limitation; and a monitoring submodule, configured to monitor the PDCCHs of the N cells based on the target limitation corresponding to the N cells.

Optionally, the determining submodule includes:

a first determining unit, configured to: in a case that V cells corresponding to the multislot-based PDCCH monitoring capability are present in the N cells and that V is a positive integer, determine V first virtual cells equivalent to the V cells, where the first virtual cell corresponds to a slot-based PDCCH monitoring capability or a symbol-level-span-based PDCCH monitoring capability; and a second determining unit, configured to: determine the target limitation corresponding to the N cells, based on a PDCCH monitoring capability corresponding to the V first virtual cells and a PDCCH monitoring capability corresponding to a first cell.

The first cell includes a cell in the N cells other than the V cells.

Optionally, the first determining unit is specifically configured to:

map a PDCCH monitoring occasion of a second cell to a frame structure of a third cell, where a first index of a subcarrier spacing (SCS) of the third cell satisfies any one of the following:

the first index being predefined, the first index being reported by the terminal or configured by a network-side device, and the first index being equal to a ratio of a second index of an SCS of the first cell to X; and determine the third cell as a first equivalent cell equivalent to the second cell in a case that a PDCCH monitoring occasion of the frame structure of the third cell satisfies a first condition.

The second cell is any one of the V cells;

the first condition is any one of the following: a PDCCH monitoring capability based on a symbol level span of the first index is satisfied; and a PDCCH monitoring capability based on a slot of the first index is satisfied; and X satisfies at least one of the following: in a case that the second cell corresponds to a slot-group-based PDCCH monitoring capability, X is the number X1 of slots included in each slot group; or in a case that the second cell corresponds to a slot-level-span-based PDCCH monitoring capability, X is the minimum number X2 of gap slots between consecutive slot level spans.

Optionally, the N cells correspond to J cell group, J being a positive integer.

In a case that the number of cells included in a target cell group is greater than a maximum value of a cell capacity parameter corresponding to the target cell group and that all cells in the target cell group correspond to a multislot-based PDCCH monitoring capability, a PDCCH processing parameter limitation corresponding to the target cell group satisfies at least one of the following:

in a case that all the cells in the target cell group correspond to a slot-group-based PDCCH monitoring capability and that P cells are divided into at least one cell group based on a first rule, a PDCCH processing parameter sum for each slot group of each cell group satisfies a PDCCH processing parameter first-limitation;

in a case that all the cells in the target cell group correspond to a slot-group-based PDCCH monitoring capability and that the P cells are divided into at least one cell group based on a second rule, a PDCCH processing parameter sum for a target slot group of each cell group satisfies the PDCCH processing parameter first-limitation, where the target slot group is a slot group corresponding to an SCS with an index being a maximum value or a minimum value in the cell group; or in a case that all the cells in the target cell group correspond to a slot-level-span-based PDCCH monitoring capability and that the P cells are divided into at least one cell group based on a third rule, a PDCCH processing parameter sum for each slot level span of each cell group satisfies the PDCCH processing parameter first-limitation; where the P cells are cells included in the target cell group, or the P cells include: a second virtual cell that is equivalent to a fourth cell of the target cell group, and a fifth cell in the target cell group other than the fourth cell; and the target cell group is any one cell group in the J cell groups.

Optionally, the first rule includes:

cells with both a same first value and a same subcarrier spacing (SCS) index are divided into one cell group; where the first value includes at least one of the following:

the number X1 of slots included in a slot group;

a time offset O1 for a start slot of the slot group; or the number Y1 of configurable PDCCH monitoring occasions within the slot group.

Optionally, the second rule includes:

cells with a same second value are divided into one cell group; where the second value includes at least one of the following:

a ratio of the number X1 of slots included in a slot group of a cell to an SCS index of the cell;

a ratio of a time offset O1 for a start slot of the slot group of the cell to the SCS index of the cell; or a ratio of the number Y1 of configurable PDCCH monitoring occasions within the slot group of the cell to the SCS index of the cell.

Optionally, the third rule includes:

cells with both a same third value and a same subcarrier spacing (SCS) index are divided into one cell group; where the third value includes at least one of the following:

the minimum number X2 of gap slots between consecutive slot level spans; or the maximum number Y2 of consecutive slots for each slot level span.

Optionally, in a case that the cells of the target cell group all correspond to the slot-level-span-based PDCCH monitoring capability and the P cells are divided into at least one cell group based on the third rule, the PDCCH processing parameter limitation corresponding to the target cell group further satisfies at least one of the following:

in a case that a slot set in which a PDCCH monitoring occasion of a first cell group is located satisfies an (X2,Y2) limitation, a PDCCH processing parameter sum for each slot level span of the first cell group after collection satisfies the PDCCH processing parameter first-limitation; or in a case that the slot set in which the PDCCH monitoring occasion of the first cell group is located does not satisfy the (X2,Y2) limitation, a PDCCH processing parameter sum for any one combination of slot level spans of different cells in the first cell group satisfies the PDCCH processing parameter first-limitation; where the first cell group is any one cell group in the at least one cell group; X2 is the minimum number of gap slots between consecutive slot level spans; and Y2 is the maximum number of consecutive slots for each slot level span.

Optionally, the N cells correspond to J cell groups, J being a positive integer.

in a case that the number of cells included in a target cell group is greater than a maximum limitation number corresponding to the target cell group, that the target cell group includes a first part of cells and a second part of cells, that cells in the first part of cells all correspond to a multislot-based PDCCH monitoring capability, and that cells in the second part of cells correspond to a slot-based PDCCH monitoring capability or a symbol-level-span-based PDCCH monitoring capability, the monitoring submodule includes:

a third determining unit, configured to determine a third virtual cell corresponding to the first part of the cells, where the third virtual cell corresponds to a slot-based PDCCH monitoring capability or a symbol-level-span-based PDCCH monitoring capability; and a fourth determining unit, configured to determine, based on a PDCCH monitoring capability corresponding to the third virtual cell and a PDCCH monitoring capability corresponding to the second part of cells, a PDCCH processing parameter limitation corresponding to the target cell group.

Optionally, the J cell groups satisfy that one cell group corresponds to Z PDCCH monitoring capability types, Z being a positive integer.

Optionally, a PDCCH monitoring capability corresponding to a cell is any one of the following:

a PDCCH monitoring capability corresponding to an active bandwidth part (BWP) of the cell; and a PDCCH monitoring capability of a virtual cell corresponding to the cell.

Optionally, a PDCCH monitoring capability corresponding to a cell is determined based on an SCS.

Optionally, the PDCCH monitoring apparatus 500 further includes:

a first transmission module, configured to send second information, where the second information is used to indicate PDCCH monitoring capability information of the terminal.

Optionally, the PDCCH monitoring capability information includes at least one of the following:

first sub-information for indicating whether the terminal supports a multislot-based PDCCH monitoring capability;

second sub-information for indicating whether the terminal supports different PDCCH monitoring capabilities for different bandwidth parts of a same cell;

third sub-information for indicating whether the terminal supports different PDCCH monitoring capabilities corresponding to different cells; or a maximum value of G cell capacity parameters, G being a positive integer.

Optionally, the first sub-information is used for indicating at least one of the following:

whether the terminal supports a slot-group-based PDCCH monitoring capability; or whether the terminal supports a slot-level-span-based PDCCH monitoring capability.

Optionally, in a case that the first sub-information indicates that the terminal supports the slot-group-based PDCCH monitoring capability, the PDCCH monitoring capability information further includes at least one of the following:

the number X1 of slots included in a slot group;

a time offset O1 for a start slot of the slot group; or the number Y1 of configurable PDCCH monitoring occasions within the slot group.

Optionally, in a case that the first sub-information indicates that the terminal supports the slot-level-span-based PDCCH monitoring capability, the PDCCH monitoring capability information further includes at least one of the following:

the minimum number X2 of gap slots between consecutive slot level spans;

the maximum number Y2 of consecutive slots for a slot level span;

the number M of slots included in a time unit corresponding to a slot level span; or a time offset O2 for the time unit corresponding to the slot level span.

Optionally, in a case that the PDCCH monitoring capacity information includes the maximum value of G cell capacity parameters, the maximum value of G cell capacity parameters corresponds to a target scenario, and the target scenario includes at least one of the following scenarios:

the N cells all matches a slot-based PDCCH monitoring capacity;

the N cells all matches a symbol-level-span-based PDCCH monitoring capacity;

at least one of the N cells matches the slot-based PDCCH monitoring capability, and at least one cell matches the symbol-level-span-based PDCCH monitoring capability;

the N cells all correspond to the multislot-based PDCCH monitoring capability;

at least one of the N cells corresponds to the multislot-based PDCCH monitoring capability, and at least one cell corresponds to the slot-based PDCCH monitoring capability;

at least one of the N cells corresponds to the multislot-based PDCCH monitoring capability, and at least one cell corresponds to the symbol-level-span-based PDCCH monitoring capability; or at least one of the N cells corresponds to the multislot-based PDCCH monitoring capability, at least one cell corresponds to the slot-based PDCCH monitoring capability, and at least one cell corresponds to the symbol-level-span-based PDCCH monitoring capability.

Optionally, in a case that the cell corresponds to the multislot-based PDCCH monitoring capability, the slot in which the PDCCH monitoring occasion of the cell is located satisfies at least one of the following:

in a case that the cell corresponds to a slot-group-based PDCCH monitoring capability, the slot in which the PDCCH monitoring occasion of the cell is located satisfies a first condition; or in a case that the cell corresponds to a slot-level-span-based PDCCH monitoring capability and a slot level span pattern is determined based on a fourth rule, the slot in which the PDCCH monitoring occasion of the cell is located satisfies that: a distance between start slots of consecutive slot level spans is not less than X2 slots, where X2 is the minimum number of gap slots between consecutive slot level spans.

Optionally, the first condition includes at least one of the following:

being within the first Y1 slots of a slot group;

being within consecutive Y1 slots in a slot group; or the number of slots in the slot group being not greater than YT; where Y1 is the number of configurable PDCCH monitoring occasions within the slot group.

Optionally, in a case that a slot level span corresponds to Q time units and Q is an integer greater than 1, the fourth rule includes at least one of the following:

in a first time unit, a start position of the 1st slot level span is a first slot in the first time unit, the first slot being the 1st slot configured with a PDCCH monitoring occasion in the first time unit; a start position of the (i+1)-th slot level span is a second slot, the second slot being configured with a PDCCH monitoring occasion and being different from the 1st slot in the i-th slot level span; and the maximum length of the slot level span is Y2 slots; or in the first time unit, the start position of the 1st slot level span is a third slot in the first time unit, the third slot having a same index as a fourth slot and the fourth slot being a slot with a smallest index in slots configured with PDCCH monitoring occasions in the Q time units; the start position of the (i+1)-th slot level span is a second slot, the second slot being configured with a PDCCH monitoring occasion and being different from the 1st slot of the i-th slot level span; and the maximum length of the slot level span is Y2 slots; where the first time unit is any one of the Q time units; Y2 is the maximum number of consecutive slots in a slot level span; and i is a positive integer.

Optionally, in a case that the cell corresponds to the multislot-based PDCCH monitoring capability, a symbol in which a PDCCH monitoring occasion of a cell is located satisfies at least one of the following:

the symbol in which the PDCCH monitoring occasion of the cell is located satisfies a second condition; or in a case that a symbol level span pattern is determined based on a fifth rule, a distance between the symbol in which the PDCCH monitoring occasion of the cell is located and a start symbol of consecutive symbol level spans is not less than X' symbols, where X' is a positive integer.

Optionally, the second condition includes at least one of the following:

within the first Y' symbols of a slot;

within consecutive Y' symbols of the slot; or the number of symbols in the slot is not greater than Y'; where Y' is a positive integer.

Optionally, in a case that the cell corresponds to the multislot-based PDCCH monitoring capability, a PDCCH processing parameter limitation for a cell satisfies at least one of the following:

in a case that the cell corresponds to a slot-group-based PDCCH monitoring capability, a PDCCH processing parameter sum for each slot group of the cell satisfies a PDCCH processing parameter first-limitation; or in a case that the cell corresponds to a slot-level-span-based PDCCH monitoring capability and a slot level span pattern is determined based on a fifth rule, a PDCCH processing parameter limitation sum for each slot level span of the cell satisfies the PDCCH processing parameter first-limitation.

Optionally, in a case that a symbol level span corresponds to K time units and K is an integer greater than 1, the fifth rule includes at least one of the following:

in a second time unit, a start position of the 1st symbol level span is a first symbol in the second time unit, the first symbol being the 1st symbol configured with a PDCCH monitoring occasion in the first time unit; a start position of the (i+1)-th symbol level span is a second symbol, the second symbol being configured with a PDCCH monitoring occasion and being different from the 1st symbol in the i-th symbol level span; and the maximum length of the symbol level span is Y' symbols; or in the second time unit, the start position of the 1st symbol level span is a third symbol in the second time unit, the third symbol having a same index as a fourth symbol and the fourth symbol being a symbol with a smallest index in symbols configured with PDCCH monitoring occasions in the K time units; the start position of the (i+1)-th symbol level span is a second symbol, the second symbol being configured with a PDCCH monitoring occasion and being different from the 1st symbol of the i-th symbol level span; and the maximum length of the symbol level span is Y' symbols; where the second time unit is any one of the K time units, Y' is a positive integer, and i is a positive integer.

Optionally, in a case that U cells in the N cells correspond to the multislot-based PDCCH monitoring capability and U is an integer greater than 1, the U cells satisfy a third condition.

Optionally, in a case that the U cells have a same SCS, the third condition includes at least one of the following:

in a case that the U cells correspond to a slot-group-based PDCCH monitoring capability, the third condition includes at least one of the following: the number X1 of slots included in a slot group is the same; a time offset O1 for a start slot of the slot group is the same; or the number Y1 of configurable PDCCH monitoring occasions within the slot group is the same; or in a case that the U cells correspond to a slot-level-span-based PDCCH monitoring capability, the third condition includes at least one of the following: X2 is the same; Y2 is the same; or (X2,Y2) is the same for the U cells and a set of slots in which the PDCCH monitoring occasions of the U cells are located satisfies an (X2,Y2) limitation; where X2 is the minimum number of gap slots between consecutive slot level spans, and Y2 is the maximum number of consecutive slots for each of the slot level spans.

Optionally, in a case that a fifth cell and a sixth cell with different SCSs are present in the U cells, the third condition includes at least one of the following:

the sixth cell is a virtual cell of the fifth cell; or a first ratio is equal to a second ratio; where the first ratio is a ratio of a fourth value to an SCS index of the fifth cell, and the second ratio is a ratio of the fourth value to an SCS index of the sixth cell; and the fourth value includes at least one of the following:

the number X1 of slots included in a slot group;

a time offset O1 for a start slot of the slot group; or the number Y1 of configurable PDCCH monitoring occasions within the slot group.

Optionally, the N cells include at least two PDCCH monitoring capabilities in a case that at least one of the following is satisfied:

supporting to determine a seventh cell as a virtual cell of an eighth cell; or supporting to determine the eighth cell as a virtual cell of the seventh cell; where the seventh cell corresponds to a multislot-based PDCCH monitoring capability; and the seventh cell corresponds to a slot-based PDCCH monitoring capability or a symbol-level-span-based PDCCH monitoring capability.

The PDCCH monitoring apparatus in this embodiment of this application may be an apparatus, or an apparatus or electronic device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The PDCCH monitoring apparatus 500 provided in this embodiment of this application can implement the processes implemented in the method embodiment in FIG. 2, with the same technical effects achieved. To avoid repetition, details are not described herein again.

Figure 6:
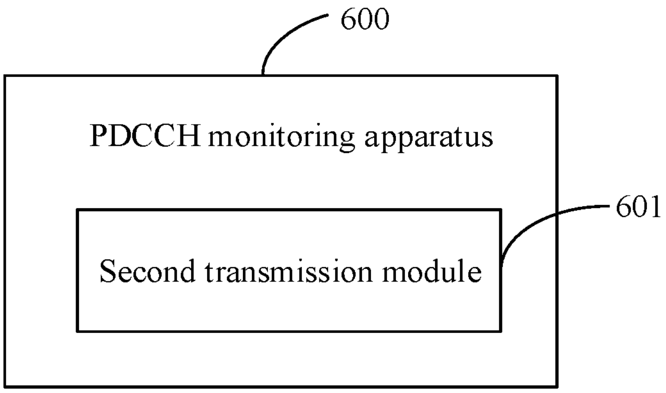
FIG. 6 is a second structural diagram of a PDCCH monitoring apparatus according to an embodiment of this application.

As shown in FIG. 6, the PDCCH monitoring apparatus 600 includes:

a second transmission module 601, configured to send first information, where the first information includes at least one of the following: a search space configuration or a PDCCH monitoring capability configuration.

Optionally, the PDCCH monitoring apparatus 600 further includes:

a second receiving module, configured to receive second information, where the second information is used to indicate PDCCH monitoring capability information of the terminal.

Optionally, the PDCCH monitoring capability information includes at least one of the following:

first sub-information for indicating whether the terminal supports a multislot-based PDCCH monitoring capability;

second sub-information for indicating whether the terminal supports different PDCCH monitoring capabilities for different bandwidth parts of a same cell;

third sub-information for indicating whether the terminal supports different PDCCH monitoring capabilities corresponding to different cells; or a maximum value of G cell capacity parameters, G being a positive integer.

Optionally, the first sub-information is used for indicating at least one of the following:

whether the terminal supports a slot-group-based PDCCH monitoring capability; or whether the terminal supports a slot-level-span-based PDCCH monitoring capability.

Optionally, in a case that the first sub-information indicates that the terminal supports the slot-group-based PDCCH monitoring capability, the PDCCH monitoring capability information further includes at least one of the following:

the number X1 of slots included in a slot group;

a time offset O1 for a start slot of the slot group; or the number Y1 of configurable PDCCH monitoring occasions within the slot group.

Optionally, in a case that the first sub-information indicates that the terminal supports the slot-level-span-based PDCCH monitoring capability, the PDCCH monitoring capability information further includes at least one of the following:

the minimum number X2 of gap slots between consecutive slot level spans;

the maximum number Y2 of consecutive slots for a slot level span;

the number M of slots included in a time unit corresponding to a slot level span; or a time offset O2 for the time unit corresponding to the slot level span.

Optionally, in a case that the PDCCH monitoring capacity information includes the maximum value of G cell capacity parameters, the maximum value of G cell capacity parameters corresponds to a target scenario, and the target scenario includes at least one of the following scenarios:

the N cells all matches a slot-based PDCCH monitoring capacity;

the N cells all matches a symbol-level-span-based PDCCH monitoring capacity;

at least one of the N cells matches the slot-based PDCCH monitoring capability, and at least one cell matches the symbol-level-span-based PDCCH monitoring capability;

the N cells all correspond to the multislot-based PDCCH monitoring capability;

at least one of the N cells corresponds to the multislot-based PDCCH monitoring capability, and at least one cell corresponds to the slot-based PDCCH monitoring capability;

at least one of the N cells corresponds to the multislot-based PDCCH monitoring capability, and at least one cell corresponds to the symbol-level-span-based PDCCH monitoring capability; or at least one of the N cells corresponds to the multislot-based PDCCH monitoring capability, at least one cell corresponds to the slot-based PDCCH monitoring capability, and at least one cell corresponds to the symbol-level-span-based PDCCH monitoring capability.

The PDCCH monitoring apparatus in this embodiment of this application may be an apparatus, or an apparatus or electric device having an operating system, or may be a component, an integrated circuit, or a chip in the network-side device. The network-side device may include, but is not limited to, the types of the network-side device 12 listed above, which is not specifically limited in this embodiment of this application.

The PDCCH monitoring apparatus 600 provided in this embodiment of this application can implement the processes implemented in the method embodiment in FIG. 3, with the same technical effects achieved. To avoid repetition, details are not described herein again.

Figure 7:
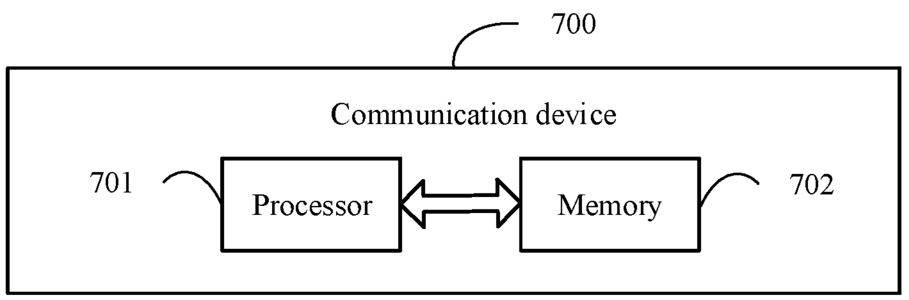
FIG. 7 is a structural diagram of a communication device according to an embodiment of this application.

Optionally, as shown in FIG. 7, an embodiment of this application further provides a communication device 700, including a processor 701, a memory 702, and a program or instructions stored in the memory 702 and capable of running on the processor 701. For example, when the communication device 700 is a terminal and when the program or the instructions are executed by the processor 701, the processes of the foregoing embodiment of the method in FIG. 2 are implemented, with the same technical effects achieved. When the communication device 700 is a network-side device and when the program or the instructions are executed by the processor 701, the processes of the foregoing embodiment of the method in FIG. 3 are implemented, with the same technical effects achieved. To avoid repetition, details are not described herein again.

An embodiment of this application further provides a terminal, including a processor and a communication interface.

The communication interface is configured to:

receive first information, where the terminal supports at least a multislot-based PDCCH monitoring capability, and the first information includes at least one of the following: a search space configuration or a PDCCH monitoring capability configuration.

The processor is configured to:

determine, based on the first information, a PDCCH monitoring capability corresponding to each of N cells of the terminal, N being an integer greater than 1; and monitor PDCCHs of the N cells based on the PDCCH monitoring capability corresponding to each of the N cells.

Figure 8:
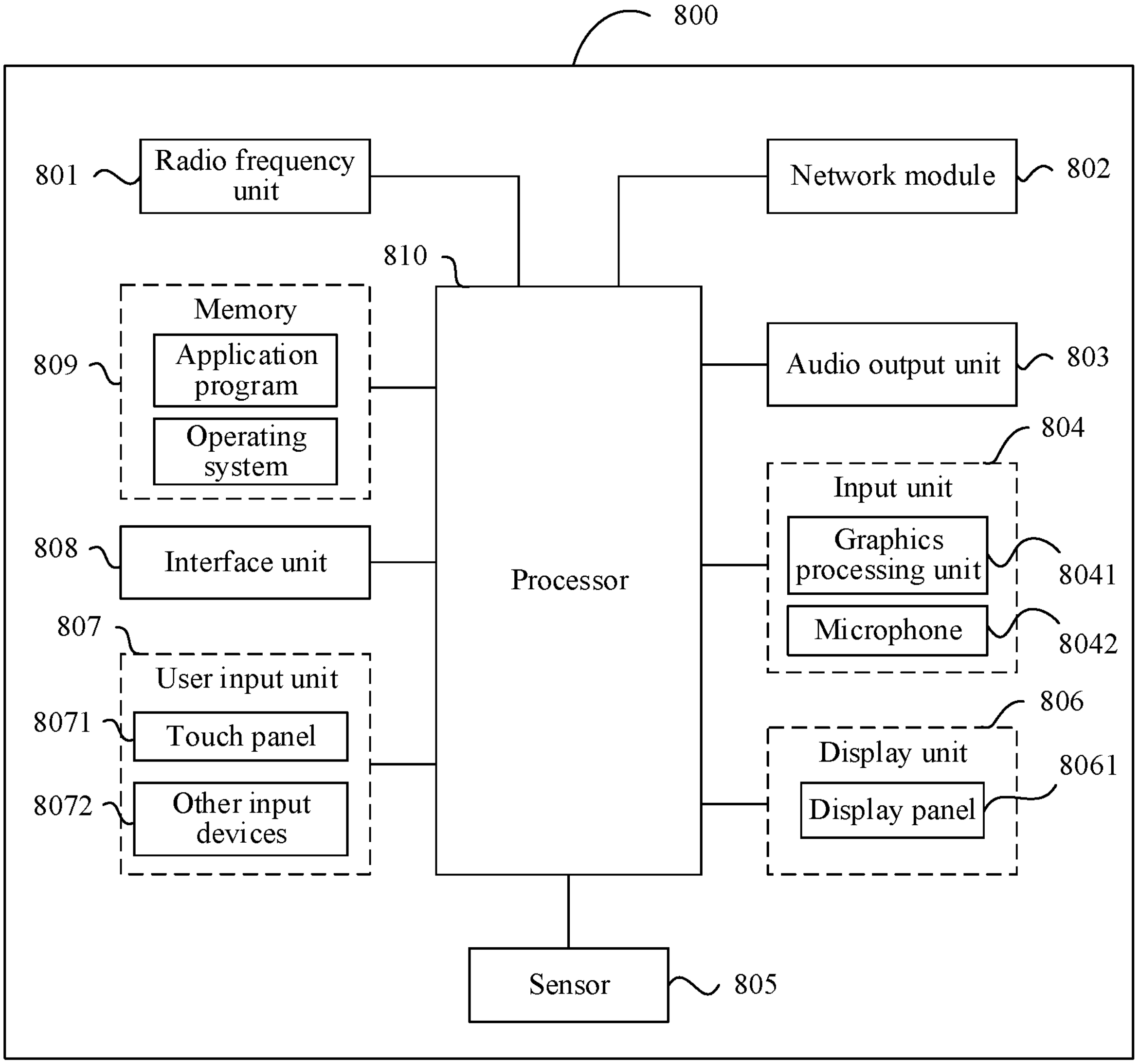
FIG. 8 is a structural diagram of a terminal according to an embodiment of this application.

The terminal embodiments correspond to the foregoing terminal-side method embodiments, and the implementation processes and implementations of the foregoing method embodiments can be applied to the terminal embodiments, with the same technical effects achieved. Specifically, FIG. 8 is a schematic diagram of a hardware structure of a terminal for implementing the embodiments of this application.

The terminal 800 includes but is not limited to at least part of components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, a battery) supplying power to the components, and the power supply may be logically connected to the processor 810 through a power management system. In this way, functions such as charge management, discharge management, and power consumption management are implemented by using the power management system. The structure of the terminal shown in FIG. 8 does not constitute any limitation on the terminal. The terminal may include more or fewer components than shown in the figure, or a combination of some components, or the components disposed differently. Details are not described herein again.

It can be understood that in this embodiment of this application, the input unit 804 may include a graphics processing unit (GPU) 8041 and a microphone 8042. The graphics processing unit 8041 processes image data of a still picture or video obtained by an image capture apparatus (such as a camera) in a video capture mode or an image capture mode. The display unit 806 may include a display panel 8061, and the display panel 8061 may be configured in a form of a liquid crystal display, an organic light-emitting diode, and the like. The user input unit 807 may include a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function key (such as a volume control key or a power on/off key), a trackball, a mouse, a joystick, and the like. Details are not described herein.

In this embodiment of this application, the radio frequency unit 801 receives downlink data from a network-side device, and then sends the downlink data to the processor 810 for processing; and also sends uplink data to the network-side device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may include a program or instruction storage area and a data storage area. The program or instruction storage area may store an operating system, an application program or instruction required by at least one function (for example, a sound playback function or an image playback function), and the like. In addition, the memory 809 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 810 may include one or more processing units. Optionally, an application processor and a modem processor may be integrated in the processor 810. The application processor primarily processes an operating system, user interfaces, application programs or instructions, and the like. The modem processor primarily processes radio communication, for example, being a baseband processor. It can be understood that the modem processor may alternatively be not integrated in the processor 810.

The radio frequency unit 801 is configured to:

receive first information, where the terminal supports at least a multislot-based PDCCH monitoring capability, and the first information includes at least one of the following: a search space configuration or a PDCCH monitoring capability configuration.

The processor 810 is configured to:

determine, based on the first information, a PDCCH monitoring capability corresponding to each of N cells of the terminal, N being an integer greater than 1; and monitor PDCCHs of the N cells based on the PDCCH monitoring capability corresponding to each of the N cells.

It should be noted that the terminal 800 in this embodiment is capable of implementing the processes of the method embodiment in FIG. 2 in the embodiments of this application, with the same beneficial effects achieved. To avoid repetition, details are not described herein again.

An embodiment of this application further provides a network-side device, including a processor and a communication interface, where the communication interface is configured to:

send first information, where the first information includes at least one of the following:

a search space configuration or a PDCCH monitoring capability configuration.

The network-side device embodiments correspond to the foregoing network-side device method embodiments, and the implementation processes and implementations of the foregoing method embodiments can be applied to the network-side device embodiments, with the same technical effects achieved.

Figure 9:
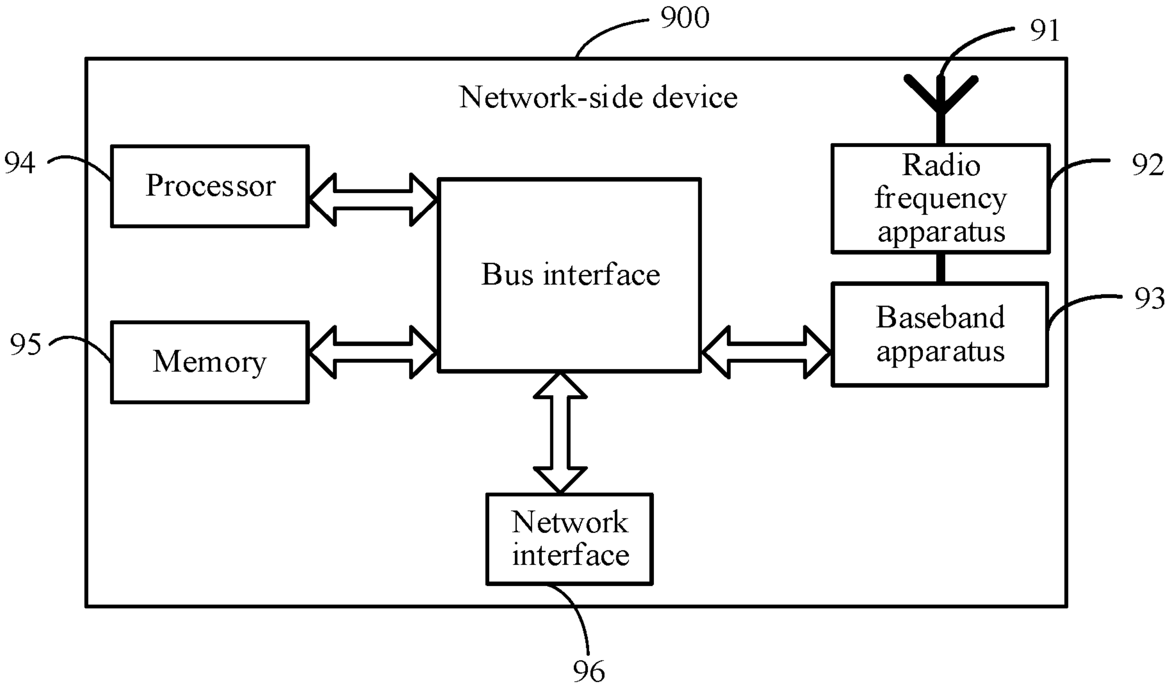
FIG. 9 is a structural diagram of a network-side device according to an embodiment of this application.

Specifically, an embodiment of this application further provides a network-side device. As shown in FIG. 9, the network device 900 includes an antenna 91, a radio frequency apparatus 92, and a baseband apparatus 93. The antenna 91 is connected to the radio frequency apparatus 92. In an uplink direction, the radio frequency apparatus 92 receives information by using the antenna 91, and sends the received information to the baseband apparatus 93 for processing. In a downlink direction, the baseband apparatus 93 processes to-be-sent information, and sends the information to the radio frequency apparatus 92; and the radio frequency apparatus 92 processes the received information and then sends the information out by using the antenna 91.

The frequency band processing apparatus may be located in the baseband apparatus 93. The method performed by the network-side device in the foregoing embodiments may be implemented in the baseband apparatus 93, and the baseband apparatus 93 includes a processor 94 and a memory 95.

The baseband apparatus 93 may include, for example, at least one baseband board, where a plurality of chips are disposed on the baseband board. As shown in FIG. 9, one of the chips, for example, the processor 94, is connected to the memory 95, to invoke a program in the memory 95 to perform the operation of the network device shown in the foregoing method embodiments.

The baseband apparatus 93 may further include a network interface 96, configured to exchange information with the radio frequency apparatus 92, where the interface is, for example, a common public radio interface (CPRI).

Specifically, the network-side device in this embodiment of this application further includes: instructions or a program stored in the memory 95 and capable of running on the processor 94. The processor 94 invokes the instructions or program in the memory 95 to execute the processes of the method embodiments in FIG. 3, or the method executed by the modules shown in FIG. 6, with the same technical effects achieved. To avoid repetition, details are not repeated herein.

An embodiment of this application further provides a computer-readable storage medium, where a computer program is stored in the computer-readable storage medium. When the computer program is executed by a processor, the processes of the foregoing PDCCH monitoring method embodiments can be implemented. To avoid repetition, details are not described herein again. The computer-readable storage medium is, for example, a read-only memory (ROM), a random access memory (RAM), a magnetic disk, or an optical disc.

An embodiment of this application further provides a readable storage medium, where a program or an instruction is stored in the readable storage medium. When the program or the instruction is executed by a processor, the processes of the foregoing method embodiments shown in FIG. 2 or FIG. 3 are implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or an instruction to implement the processes of the foregoing method embodiments in FIG. 2 or FIG. 3, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A physical downlink control channel (PDCCH) monitoring method, comprising:

receiving, by a terminal, first information, wherein the terminal supports at least a multislot-based PDCCH monitoring capability, and the first information comprises a PDCCH monitoring capability configuration;

determining, by the terminal based on the first information, a PDCCH monitoring capability corresponding to each of N cells of the terminal, N being an integer greater than 1; and monitoring, by the terminal, PDCCHs of the N cells based on the PDCCH monitoring capability corresponding to each of the N cells;

wherein the monitoring, by the terminal, PDCCHs of the N cells based on the PDCCH monitoring capability corresponding to each of the N cells comprises:

determining, by the terminal based on the PDCCH monitoring capability corresponding to each of the N cells, a target limitation corresponding to the N cells, wherein the target limitation comprises a PDCCH processing parameter limitation; and monitoring, by the terminal, the PDCCHs of the N cells based on the target limitation corresponding to the N cells;

wherein the N cells correspond to J cell groups, J being a positive integer; and wherein in a case that the number of cells comprised in a target cell group is greater than a maximum value of a cell capacity parameter corresponding to the target cell group and that all cells in the target cell group correspond to a multislot-based PDCCH monitoring capability, a PDCCH processing parameter limitation corresponding to the target cell group satisfies:

in a case that all the cells in the target cell group correspond to a slot-group-based PDCCH monitoring capability and that P cells are divided into at least one cell group based on a first rule, a PDCCH processing parameter sum for each slot group of each cell group satisfies a PDCCH processing parameter first-limitation;

wherein the P cells are cells comprised in the target cell group, and the target cell group is any one cell group in the J cell groups;

wherein the first rule comprises cells with both a same first value and a same subcarrier spacing (SCS) index are divided into one cell group, and the first value comprises the number X1 of slots comprised in a slot group.

2. The method according to claim 1, wherein a PDCCH monitoring capability corresponding to a cell is any one of the following:

a PDCCH monitoring capability corresponding to an active bandwidth part (BWP) of the cell; and a PDCCH monitoring capability of a virtual cell corresponding to the cell.

3. The method according to claim 1, wherein a PDCCH monitoring capability corresponding to a cell is determined based on an SCS.

4. The method according to claim 1, wherein before the receiving, by a terminal, first information, the method further comprises:

sending, by the terminal, second information, wherein the second information is used to indicate PDCCH monitoring capability information of the terminal.

5. The method according to claim 1, wherein the PDCCH monitoring capability information comprises at least one of the following:

first sub-information for indicating whether the terminal supports a multislot-based PDCCH monitoring capability;

second sub-information for indicating whether the terminal supports different PDCCH monitoring capabilities for different bandwidth parts of a same cell;

third sub-information for indicating whether the terminal supports different PDCCH monitoring capabilities corresponding to different cells; or a maximum value of G cell capacity parameters, G being a positive integer.

6. The method according to claim 5, wherein the first sub-information is used for indicating:

whether the terminal supports a slot-group-based PDCCH monitoring capability; or whether the terminal supports a slot-group-based PDCCH monitoring capability and whether the terminal supports a slot-level-span-based PDCCH monitoring capability.

7. The method according to claim 1, wherein in a case that U cells in the N cells correspond to the multislot-based PDCCH monitoring capability and U is an integer greater than 1, the U cells satisfy a third condition.

8. The method according to claim 1, wherein the PDCCH processing parameter limitation comprises at least one of: a Blind Decoding (BD) quantity limitation or a Control Channel Element (CCE) quantity limitation.

9. A PDCCH monitoring method, comprising:

sending, by a network-side device, first information to a terminal which supports at least a multislot-based PDCCH monitoring capability, wherein the first information comprises a PDCCH monitoring capability configuration;

wherein the first information is used for the terminal to: determine a PDCCH monitoring capability corresponding to each of N cells of the terminal, N being an integer greater than 1, monitor PDCCHs of the N cells based on the PDCCH monitoring capability corresponding to each of the N cells;

wherein monitoring PDCCHs of the N cells based on the PDCCH monitoring capability corresponding to each of the N cells comprises: determining, based on the PDCCH monitoring capability corresponding to each of the N cells, a target limitation corresponding to the N cells, wherein the target limitation comprises a PDCCH processing parameter limitation; and monitoring, the PDCCHs of the N cells based on the target limitation corresponding to the N cells;

wherein the N cells correspond to J cell groups, J being a positive integer; and wherein in a case that the number of cells comprised in a target cell group is greater than a maximum value of a cell capacity parameter corresponding to the target cell group and that all cells in the target cell group correspond to a multislot-based PDCCH monitoring capability, a PDCCH processing parameter limitation corresponding to the target cell group satisfies:

in a case that all the cells in the target cell group correspond to a slot-group-based PDCCH monitoring capability and that P cells are divided into at least one cell group based on a first rule, a PDCCH processing parameter sum for each slot group of each cell group satisfies a PDCCH processing parameter first-limitation;

wherein the P cells are cells comprised in the target cell group, and the target cell group is any one cell group in the J cell groups;

wherein the first rule comprises: cells with both a same first value and a same subcarrier spacing, SCS, index are divided into one cell group, wherein the first value comprises: the number X1 of slots comprised in a slot group.

10. The method according to claim 9, wherein before the sending, by a network-side device, first information, the method further comprises:

receiving, by the network-side device, second information, wherein the second information is used to indicate PDCCH monitoring capability information of a terminal.

11. The method according to claim 9, wherein the PDCCH monitoring capability information comprises at least one of the following:

first sub-information for indicating whether a terminal supports a multislot-based PDCCH monitoring capability;

second sub-information for indicating whether the terminal supports different PDCCH monitoring capabilities for different bandwidth parts of a same cell;

third sub-information for indicating whether the terminal supports different PDCCH monitoring capabilities corresponding to different cells; or a maximum value of G cell capacity parameters, G being a positive integer.

12. The method according to claim 11, wherein the first sub-information is used for indicating:

whether the terminal supports a slot-group-based PDCCH monitoring capability; or whether the terminal supports a slot-group-based PDCCH monitoring capability and whether the terminal supports a slot-level-span-based PDCCH monitoring capability.

13. The method according to claim 9, wherein the PDCCH processing parameter limitation comprises at least one of: a Blind Decoding (BD) quantity limitation or a Control Channel Element (CCE) quantity limitation.

14. A terminal, comprising:

a processor implemented in hardware, a memory, and a program or instructions stored in the memory and capable of running on the processor, wherein the program or the instructions, when executed by the processor, causes the terminal to perform:

receiving first information, wherein the terminal supports at least a multislot-based PDCCH monitoring capability, and the first information comprises at least one of the following: a search space configuration or a PDCCH monitoring capability configuration;

determining, based on the first information, a PDCCH monitoring capability corresponding to each of N cells of the terminal, N being an integer greater than 1; and monitoring PDCCHs of the N cells based on the PDCCH monitoring capability corresponding to each of the N cells;

determining, based on the PDCCH monitoring capability corresponding to each of the N cells, a target limitation corresponding to the N cells, wherein the target limitation comprises a PDCCH processing parameter limitation; and monitoring the PDCCHs of the N cells based on the target limitation corresponding to the N cells;

wherein the N cells correspond to J cell groups, J being a positive integer; and wherein in a case that the number of cells comprised in a target cell group is greater than a maximum value of a cell capacity parameter corresponding to the target cell group and that all cells in the target cell group correspond to a multislot-based PDCCH monitoring capability, a PDCCH processing parameter limitation corresponding to the target cell group satisfies:

in a case that all the cells in the target cell group correspond to a slot-group-based PDCCH monitoring capability and that P cells are divided into at least one cell group based on a first rule, a PDCCH processing parameter sum for each slot group of each cell group satisfies a PDCCH processing parameter first-limitation;

wherein the P cells are cells comprised in the target cell group, and the target cell group is any one cell group in the J cell groups;

wherein the first rule comprises:

cells with both a same first value and a same subcarrier spacing (SCS) index are divided into one cell group; wherein the first value comprises the number X1 of slots comprised in a slot group.

15. The terminal according to claim 14, wherein the PDCCH processing parameter limitation comprises at least one of: a Blind Decoding (BD) quantity limitation or a Control Channel Element (CCE) quantity limitation.

16. A network-side device, comprising:

a processor implemented in hardware, a memory, and a program or instructions stored in the memory and capable of running on the processor, wherein when the program or the instructions are executed by the processor, the PDCCH monitoring method according to claim 9 is implemented.

* * * * *